April 18, 1939.  S. SMITH  2,154,825
MACHINE FOR MAKING LAMINATED CONTAINERS
Filed Sept. 18, 1936  13 Sheets-Sheet 1
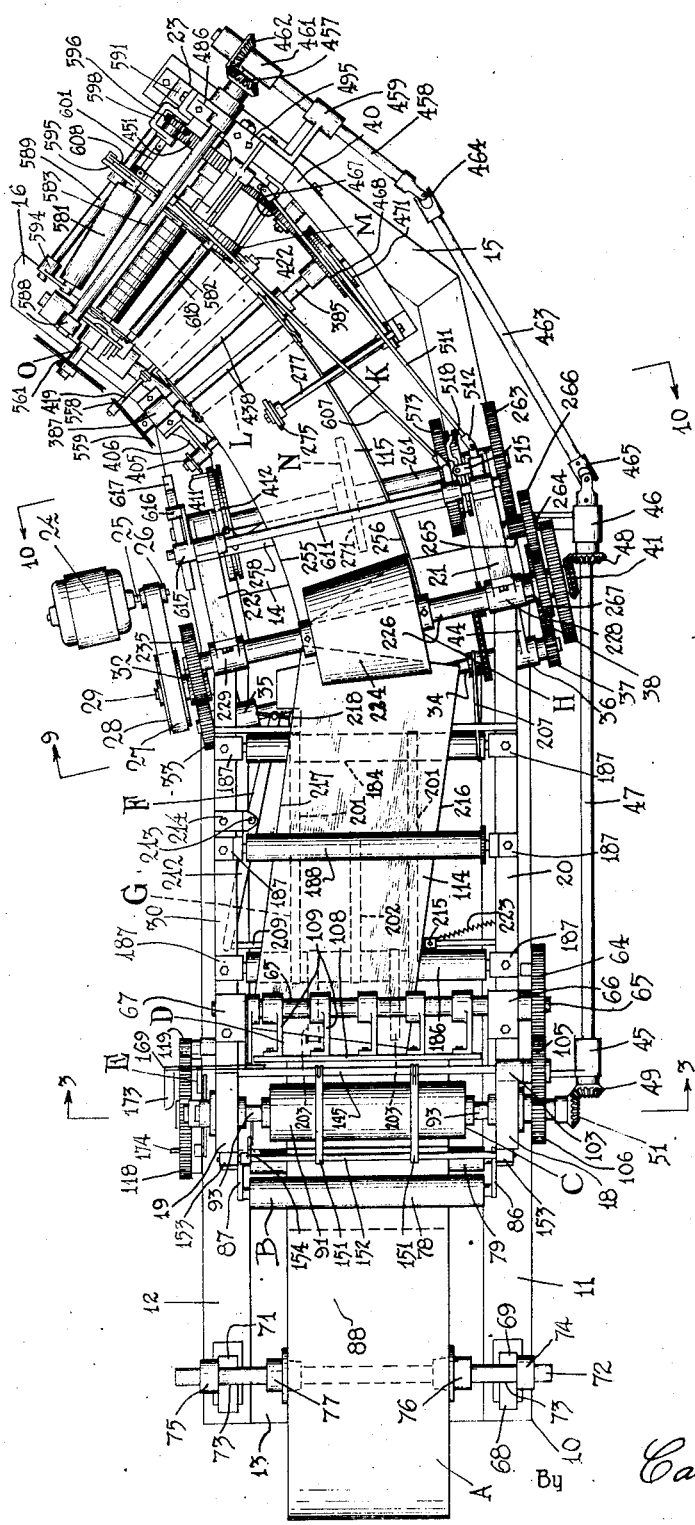
Inventor
Swan Smith.
By Caswell & Lagaard
Attorneys

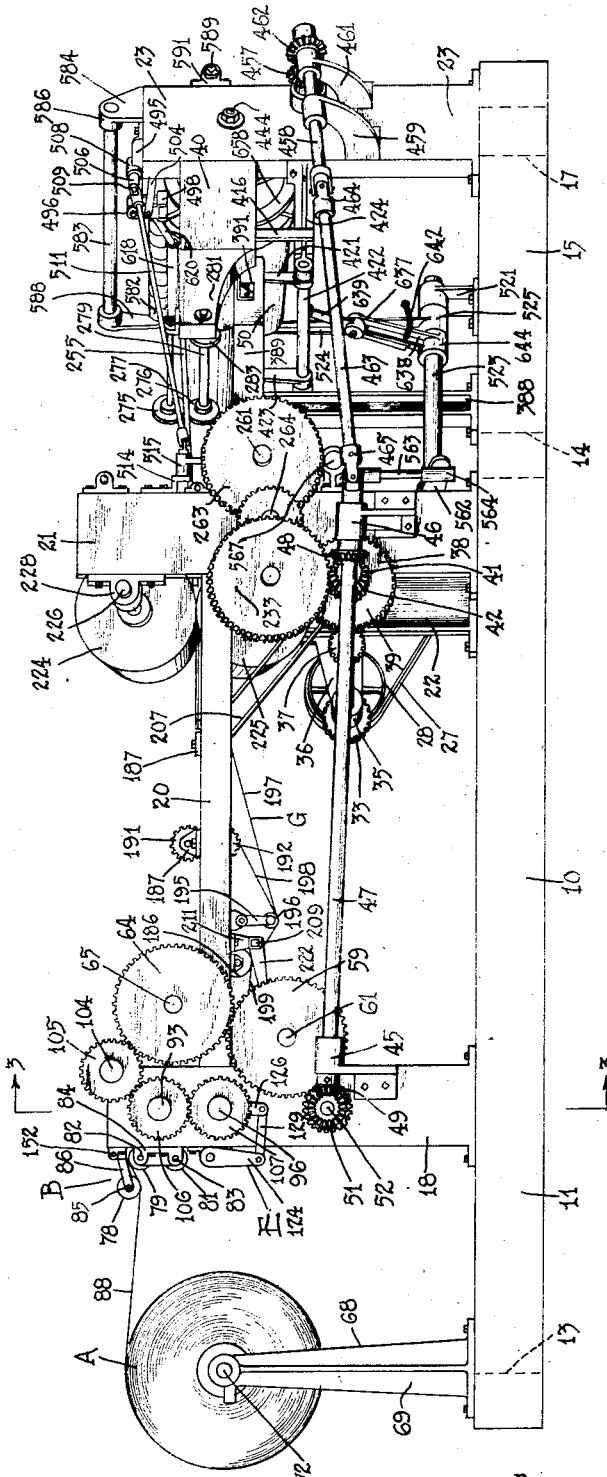

April 18, 1939.  S. SMITH  2,154,825
MACHINE FOR MAKING LAMINATED CONTAINERS
Filed Sept. 18, 1936  13 Sheets-Sheet 3
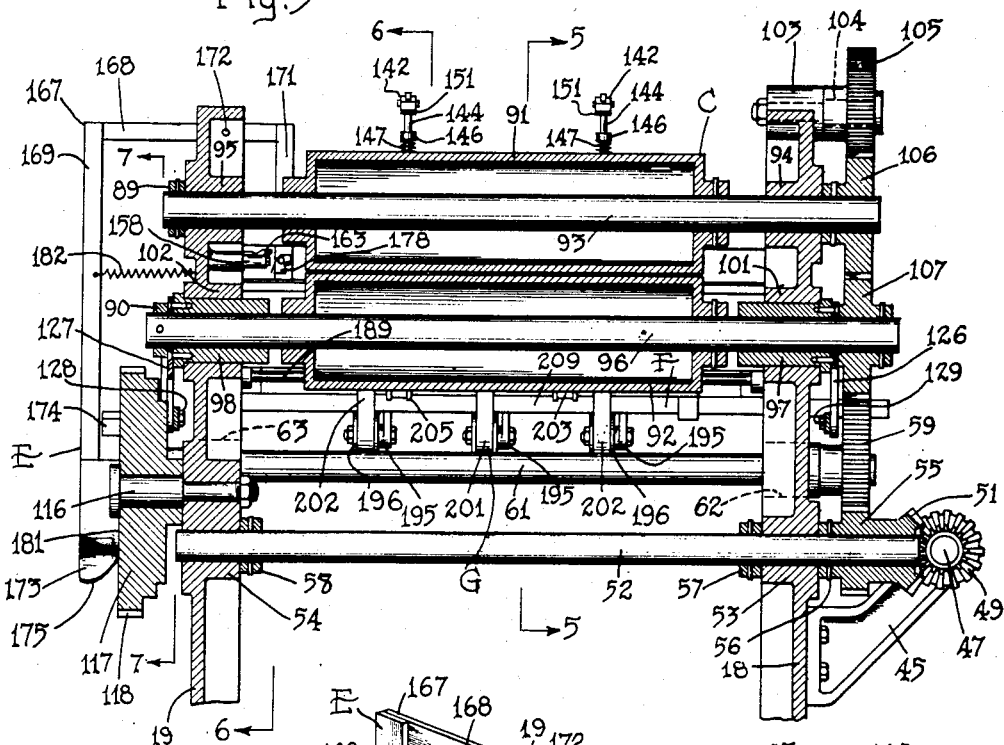
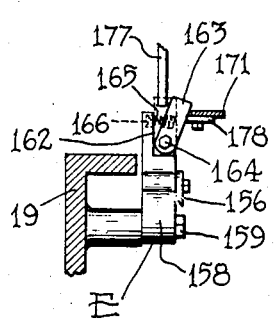
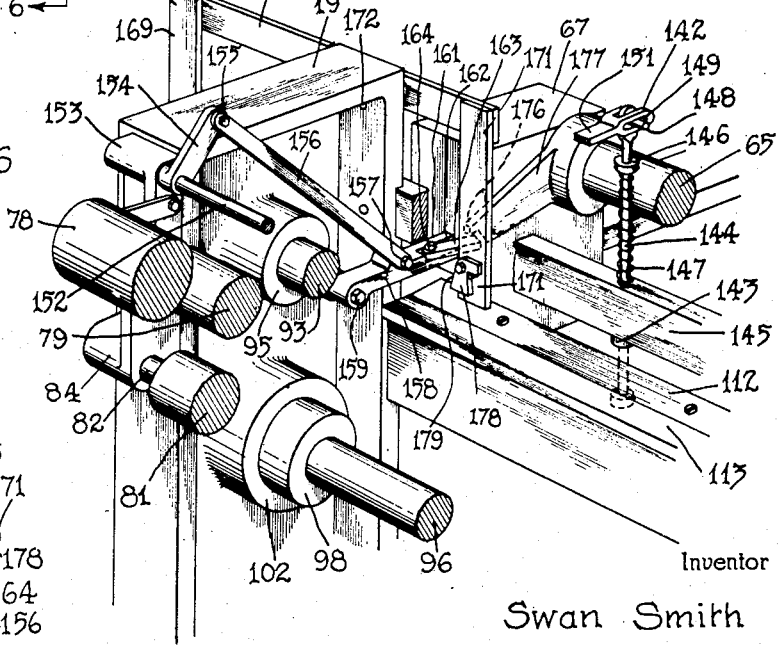
Inventor
Swan Smith
By Caswell & Lagaard
Attorneys April 18, 1939.　　　　S. SMITH　　　　2,154,825
MACHINE FOR MAKING LAMINATED CONTAINERS
Filed Sept. 18, 1936　　　13 Sheets-Sheet 4
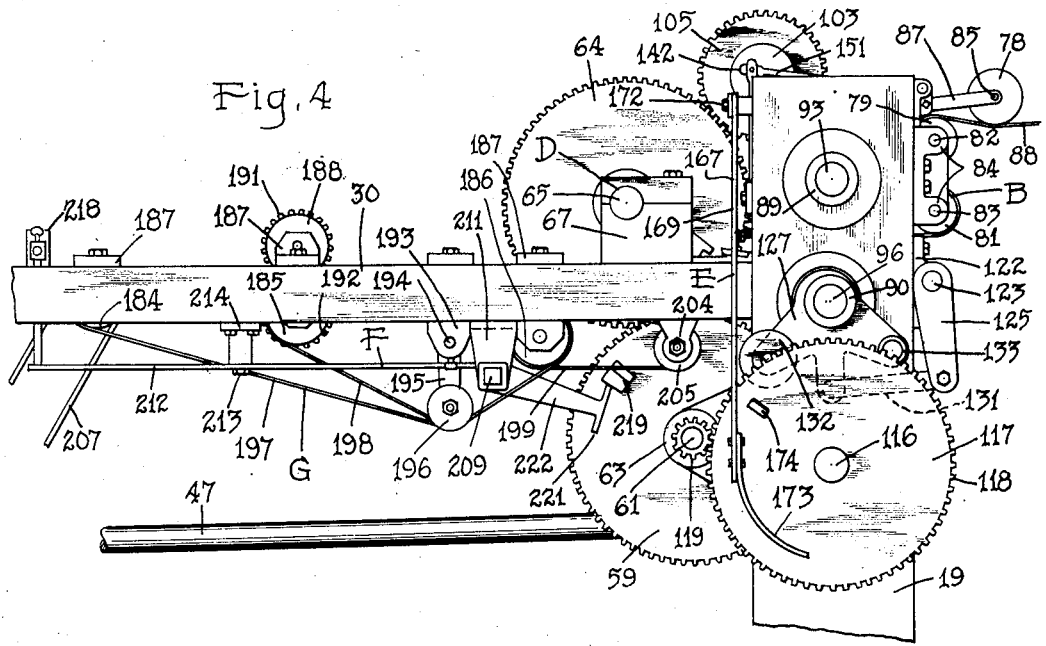
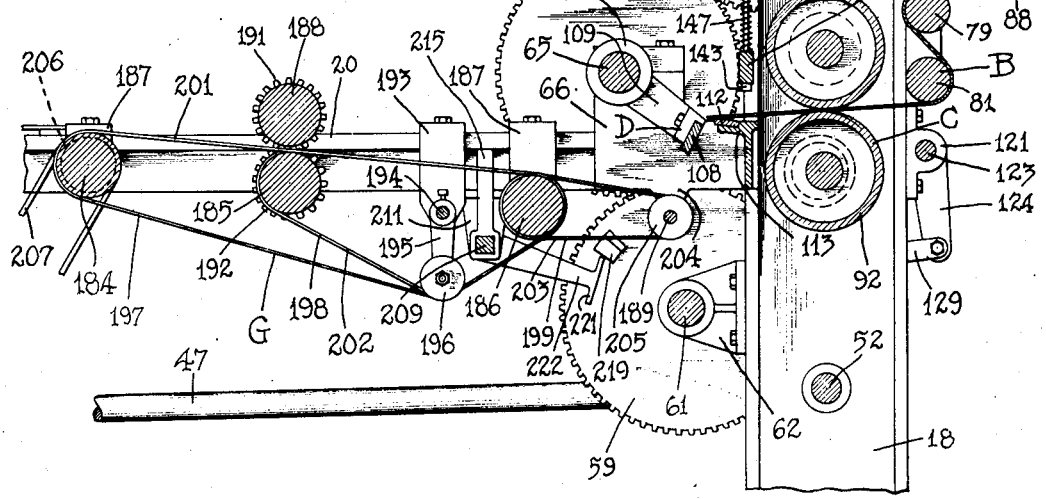
Inventor
Swan Smith
By Caswell & Lagaard
Attorneys

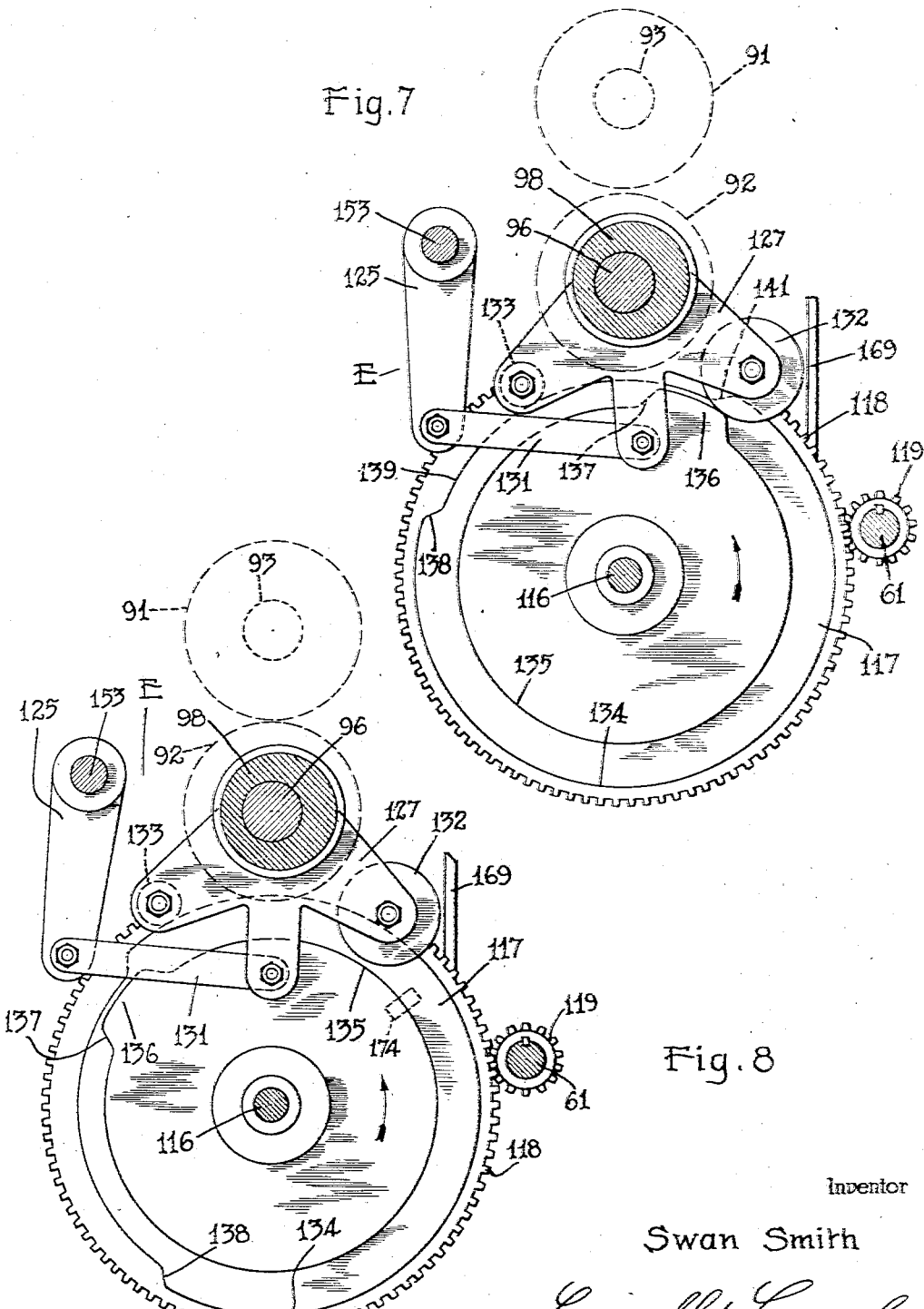

April 18, 1939. S. SMITH 2,154,825
MACHINE FOR MAKING LAMINATED CONTAINERS
Filed Sept. 18, 1936 13 Sheets-Sheet 6
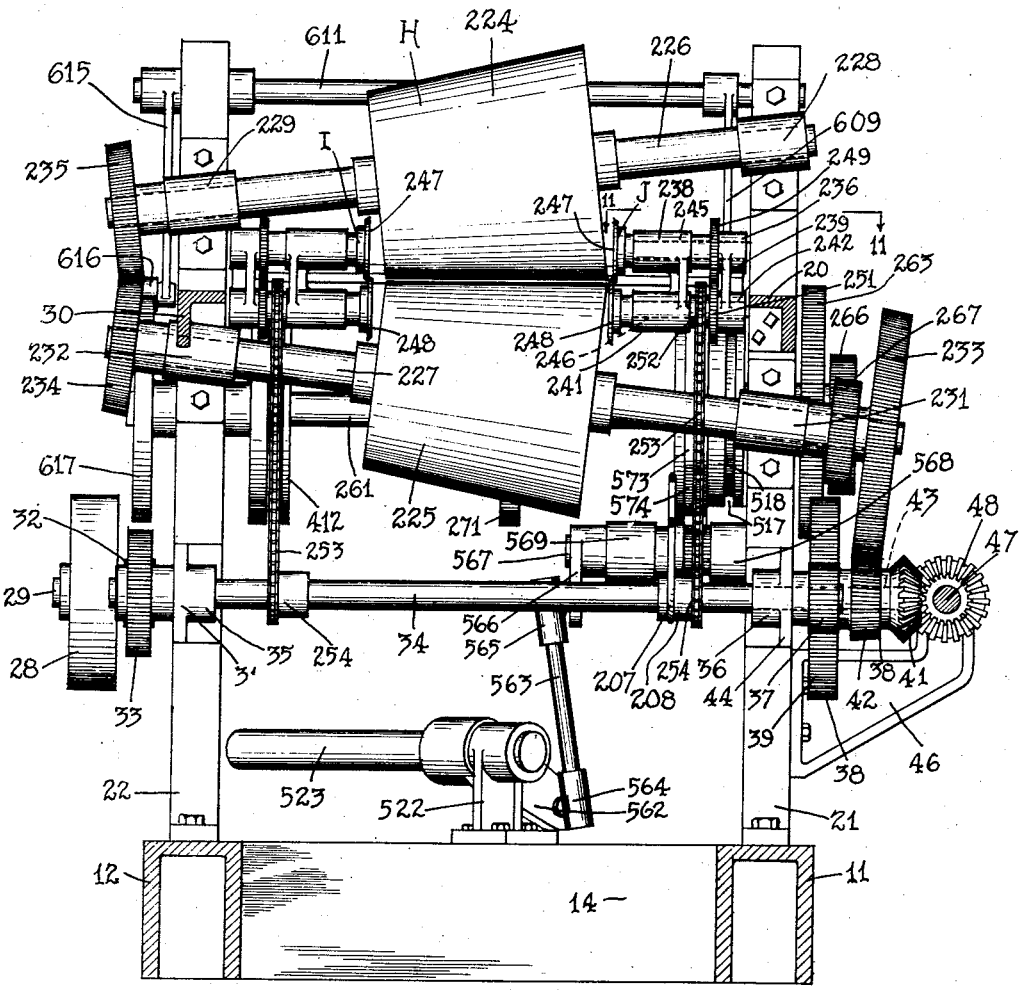
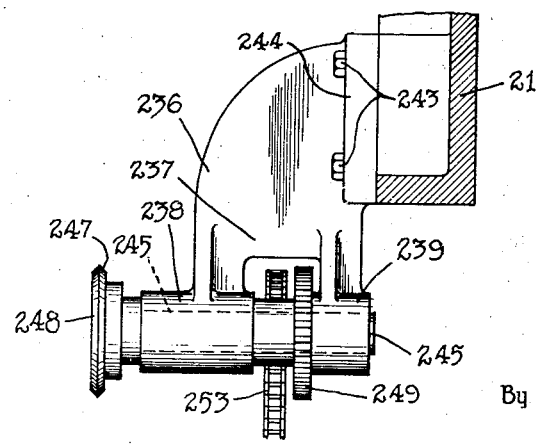
Inventor
Swan Smith
By Caswell & Lagaard
Attorneys April 18, 1939. S. SMITH 2,154,825
MACHINE FOR MAKING LAMINATED CONTAINERS
Filed Sept. 18, 1936 13 Sheets-Sheet 7

Inventor
Swan Smith
By Caswell & Lagaard
Attorneys

April 18, 1939.    S. SMITH    2,154,825
MACHINE FOR MAKING LAMINATED CONTAINERS
Filed Sept. 18, 1936    13 Sheets-Sheet 9

Inventor
Swan Smith
By Caswell & Lagaard
Attorneys

April 18, 1939.  S. SMITH  2,154,825
MACHINE FOR MAKING LAMINATED CONTAINERS
Filed Sept. 18, 1936    13 Sheets-Sheet 10
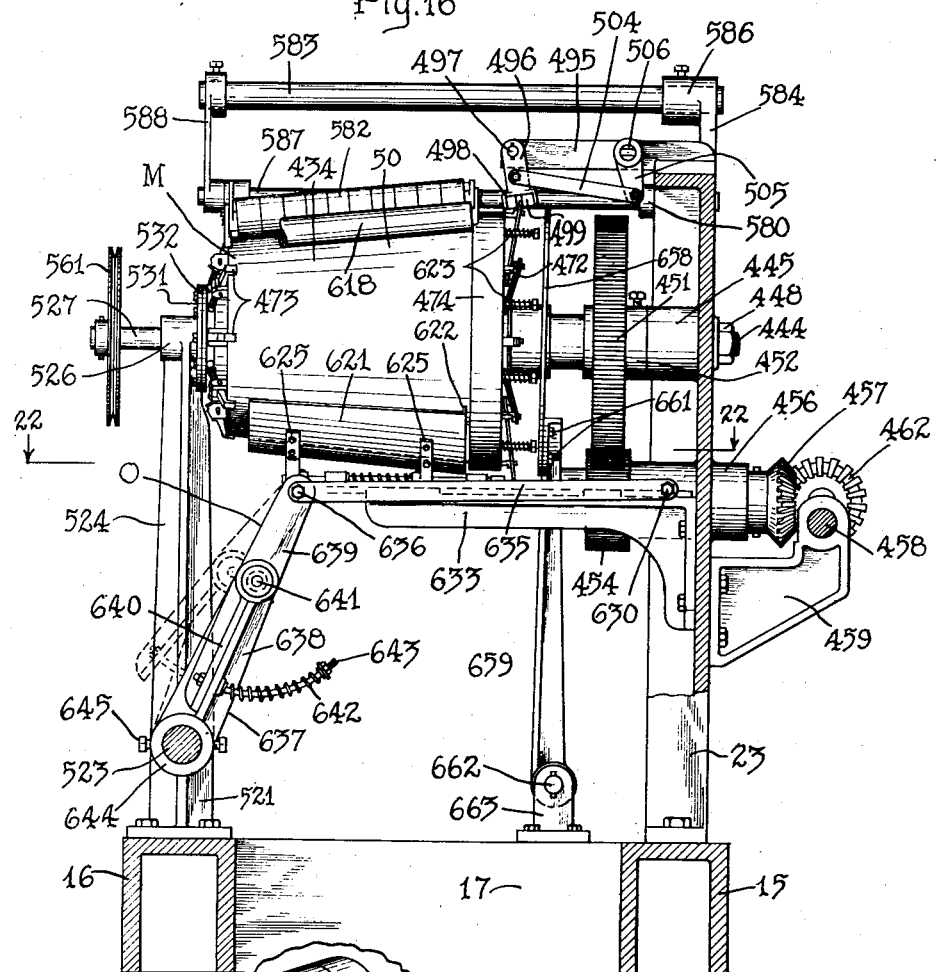
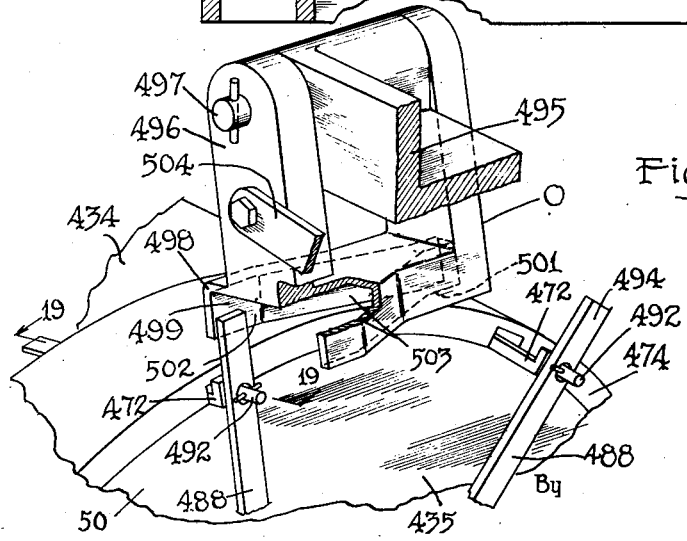
Inventor
Swan Smith
By Caswell & Lagaard
Attorneys

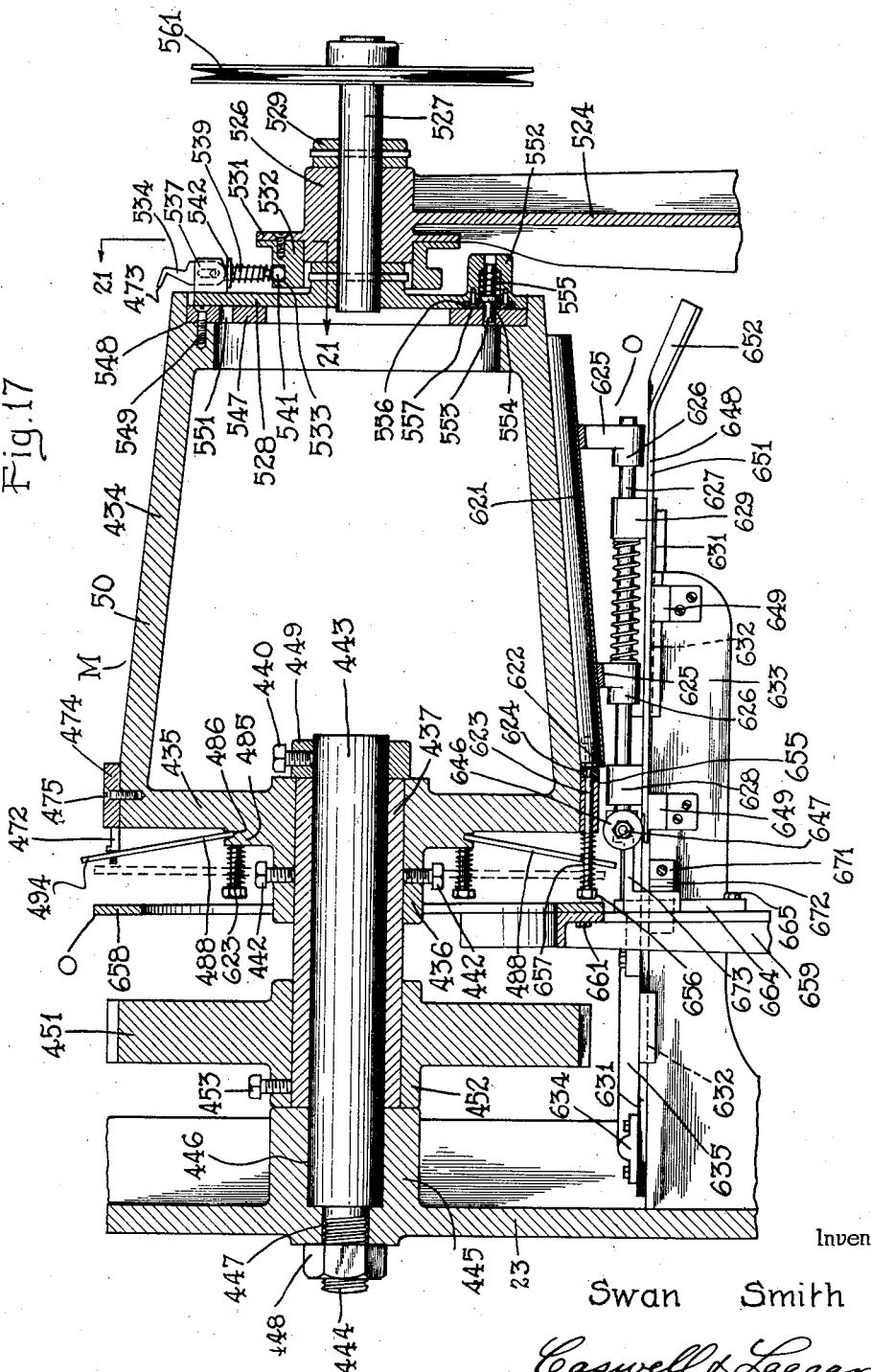

April 18, 1939.　　　S. SMITH　　　2,154,825
MACHINE FOR MAKING LAMINATED CONTAINERS
Filed Sept. 18, 1936　　　13 Sheets-Sheet 12

Inventor
Swan Smith
By Caswell & Lagaard
Attorneys

April 18, 1939.  S. SMITH  2,154,825
MACHINE FOR MAKING LAMINATED CONTAINERS
Filed Sept. 18, 1936  13 Sheets—Sheet 13

Inventor
Swan Smith
By Caswell & Lagaard
Attorneys

Patented Apr. 18, 1939

2,154,825

UNITED STATES PATENT OFFICE 2,154,825

MACHINE FOR MAKING LAMINATED CONTAINERS

Swan Smith, White Bear, Minn., assignor to David C. Shepard, St. Paul, Minn.

Application September 18, 1936, Serial No. 101,451

41 Claims. (Cl. 93—79)

My invention relates to machines for making laminated containers and particularly to machines for making the side wall of a container.

An object of the invention resides in providing a machine for making a tubular side wall.

Another object of the invention resides in providing a machine by means of which the side wall is completely fabricated from a continuous strip of paper.

A still further object of the invention resides in providing a machine in which the side wall is automatically fabricated.

Another object of the invention resides in providing a machine by means of which a conical side wall is formed.

An object of the invention resides in providing a machine in which sheets of paper are cut from a continuous strip and separately assembled into final form.

Another object of the invention resides in providing a machine in which the severed sheets are cut arcuate in form and assembled on a conical mandrel.

A still further object of the invention resides in providing a machine in which the sheets are caused to travel along an arcuate path and cut in arcuate form while so traveling.

An object of the invention resides in providing a machine in which adhesive is applied to the sheets as they are assembled and in which the adhesive is omitted from one of the sheets.

Another object of the invention resides in providing a machine in which the completed structure is removed endwise from the mandrel on which it is formed.

A still further object of the invention resides in providing a machine in which the sheets are temporarily held attached to the mandrel and the partly formed side wall while other sheets are being applied thereto.

Other objects of the invention reside in the novel combination and arrangement of parts and in the details of construction hereinafter illustrated and/or described.

In the drawings:

Fig. 1 is a plan view of a paper tub making machine illustrating an embodiment of my invention.

Fig. 2 is a side elevational view of the structure shown in Fig. 1 and viewed from the near side thereof.

Fig. 3 is a fragmentary elevational sectional view taken on line 3—3 of Fig. 1.

Fig. 4 is an elevational view of the structure shown in Fig. 3 observed from the left.

Fig. 5 is a sectional view of the structure shown in Fig. 3 and taken on line 5—5 of Fig. 3.

Fig. 6 is a perspective view of a portion of the structure shown in Fig. 3 with parts cut away to illustrate the details of construction of certain portions of the invention, said view being taken substantially on line 6—6 of Fig. 3.

Fig. 7 is a fragmentary elevational sectional view taken on line 7—7 of Fig. 3 and drawn to a larger scale.

Fig. 8 is a view similar to Fig. 7 showing the parts in altered relation.

Fig. 9 is an elevational sectional view of the central part of the machine taken on line 9—9 of Fig. 1.

Fig. 11 is a fragmentary plan sectional view taken on line 11—11 of Fig. 9.

Fig. 16 is an elevational sectional view taken on line 16—16 of Fig. 14.

Fig. 17 is an elevational sectional view of the wrapping mechanism taken on line 17—17 of Fig. 15.

Fig. 18 is a perspective view of a portion of the structure shown in Figs. 16 and 17.

Fig. 25 is a detail view of a portion of the arresting mechanism.

Figure 10:
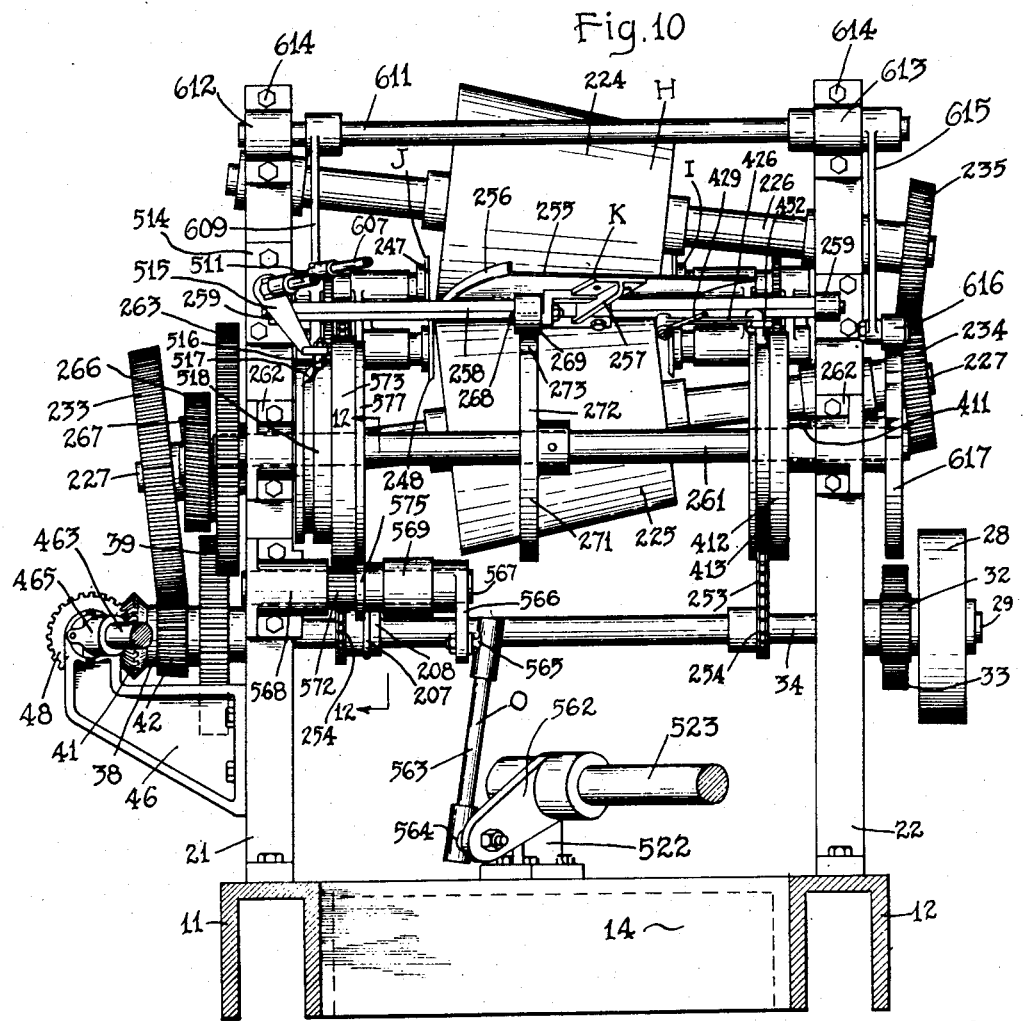
Fig. 10 is a view similar to Fig. 7 taken on line 10—10 of Fig. 1.

A machine illustrating an embodiment of my invention is shown in its entirety in Figs. 1 and 2. The paper from which the containers are constructed is reeled from a roll A and passes through a tensioning device B. A feed mechanism C advances the paper through the machine where sheets of paper are severed from the roll by means of a transverse cutter D. After a predetermined number of sheets have been severed and are being formed into the container the feed mechanism is arrested by an arresting device E. As the sheets are separated from the roll, said sheets are shifted angularly in a lateral direction with respect to the direction of travel of the sheet through the feed mechanism which is accomplished by means of a skewing device designated by the reference character F. While in such position the sheets are further progressed through the machine by a conveyor G. The conveyor G transfers the skewed sheets to a feed mechanism H which causes the sheet to travel in the arc of a circle. Associated with the feed device H are longitudinal trimming cutters I and J, Fig. 9, which cut the sheet with arcuate edges as the same is fed by the feed mechanism H. The arcuate sheets are disposed upon a tray K which is associated with a gluing device L by means of which adhesive is applied to the formed sheets. From the gluing device the sheets pass to a wrapping mechanism M including a mandrel 50 to be subsequently more fully described, on which the sheets are wrapped. A skip mechanism N prevents gluing of the first sheet wrapped about the mandrel and causes gluing of the subsequent sheets. After the sheets have been wrapped about the mandrel the assembled structure is removed therefrom by means of an ejecting mechanism O. These various mechanisms and the supports and drives therefor will now be described in detail.

The entire machine is mounted upon a base 10 which consists of two longitudinal frame members 11 and 12 which extend throughout the major portion of the machine. These two frame members are connected together by means of transverse frame members 13 and 14 which are disposed at the ends of said longitudinal frame members. The frame members 11 and 12 terminate intermediate the ends of the machine and have attached at their ends other longitudinal frame members 15 and 16 which are held in spaced relation by means of the transverse frame member 14 and another transverse frame member 17 secured to the same at the rearward end thereof.

The framework for the machine further includes two uprights 18 and 19 which are attached to the longitudinal frame members 11 and 12 and which are disposed toward the forward end of the machine. At the other ends of the longitudinal frame members 11 and 12 are provided two other uprights 21 and 22 which are arranged in skewed relation as best shown in Fig. 1. Between the uprights 18 and 21 is disposed a longitudinal frame member 20 and between the uprights 19 and 22 is disposed a corresponding longitudinal frame member 30. At the rearward end of the machine is another upright 23 which is attached to the longitudinal frame member 15. The upright 23 has attached to it a cantilever frame member 40 which supports various parts of the mechanism as will be presently described in detail.

For the purpose of driving the various mechanisms and operating the various devices of the invention, an electric motor 24 is employed which may be mounted on the floor or may be attached to any suitable support. This motor is provided with an armature shaft 25 which has attached to it a pulley 26. A belt 27 passes over the pulley 26 and another pulley 28 mounted on a stub shaft 29. Stub shaft 29 is rigidly attached to a bracket 31 (Fig. 9) which in turn is secured to the upright 22 previously referred to. The pulley 28 has secured to it a spur gear 32 which meshes with a spur gear 33 fast on a shaft 34 which constitutes the main drive shaft of the machine. Shaft 34 is journaled in two bearings 35 and 36 of which the bearing 35 is attached to the bracket 31 of which the bearing 36 is attached to another bracket 44 similar to the bracket 31. These bearings may be cast integral with said uprights as illustrated in the drawings, or if desired, the same may be formed separately and secured thereto. Drive shaft 34 has secured to the other end thereof a spur pinion 37. This spur pinion drives a gear cluster indicated in its entirety by the reference numeral 38. Gear cluster 38 includes a spur gear 39, a bevel gear 41 and another bevel gear 42. All of these gears are secured together and the cluster is mounted for rotation on a stud 43 (Fig. 9) which is attached to bracket 44.

Attached to the two uprights 18 and 21 are two bearings 45 and 46 which journal a longitudinally extending counter-shaft 47. Counter-shaft 47 has attached to it at one end and adjacent bearing 46 a bevel gear 48 which meshes with bevel gear 41 of the gear cluster 38. Shaft 47 has secured to it at its other end a bevel gear 49 which meshes with another bevel gear 51 fast on a shaft 52. Shaft 52 is journaled in two bearings 53 and 54 (best shown in Fig. 3) which are cast integral with the uprights 18 and 19. The bevel gear 51 is formed integral with a spur pinion 55 and the said unit is secured to shaft 52 by means of a pin 56. Shaft 52 is deprived of longitudinal movement by means of two collars 57 and 58 which bear against the inner ends of the bearings 53 and 54 and which are secured to said shaft. The spur pinion 55 meshes with a spur gear 59 which is mounted upon the end of another shaft 61. Shaft 61 is journaled in two bearings 62 and 63 which are bolted to the uprights 18 and 19 as clearly indicated in Figs. 4 and 5. Shaft 61 operates in a manner to be presently described to drive the arresting device E. Meshing with the spur gear 59 is another spur gear 64 which is mounted upon the end of a shaft 65. This shaft is journaled in two bearings 66 and 67 which are attached to the longitudinal frame members 20 and 30. The cutter and feed mechanisms are both operated from shaft 65 in a manner to be presently described in detail.

The roll A of paper is carried by a roll support 68 which comprises two standards 69 and 71 which are secured to the longitudinal frame members 11 and 12 of base 10. A shaft 72 rests in sockets 73 in the standards 69 and 71 and directly supports the roll of paper A. Collars 74 and 75 attached to the ends of the shaft 72 hold the same in position upon the standards 69 and 71, while end cores 76 and 77 mounted upon said shaft hold the paper in proper position thereon. The tensioning device B consists of three rolls 78, 79 and 81. Rolls 79 and 81 are constructed with trunnions 82 and 83 which are journaled in bearings 84 secured to the uprights 18 and 19. The roll 78 is similarly constructed with trunnions 85 which are journaled at the ends of two swinging arms 86 and 87 which are in turn pivoted to the uprights 18 and 19. The unrolled portion of the paper coming from roll A is indicated by the reference numeral 88 and passes beneath the roll 78 over the roll 79 and beneath the roll 81 where it enters feed mechanism C.

The feed mechanism C is best illustrated in Figs. 3 and 5 and consists of two feed rolls 91 and 92. Roll 91 is mounted upon a shaft 93 which is journaled in bearings 94 and 95 cast integral with the uprights 18 and 19. Roll 92 is attached to a shaft 96 which is journaled in two eccentric bushings 97 and 98. These bushings are in turn rotatably mounted in bearings 101 and 102 which are cast integral with the uprights 18 and 19. By means of the two eccentric bushings 97 and 98 the roll 92 may be moved toward and from the roll 91, thereby varying the pressure upon the unrolled portion 88 of the paper. When sufficient pressure is procured the rolls cause the paper to travel through the machine and when the roll 92 is sufficiently separated from the roll 91, the feeding terminates.

The two feed rolls 91 and 92 are driven in the following manner: At the uppermost portion of the upright 18 is a boss 103 which has secured to it a stud 104. A spur gear 105 is rotatably mounted on stud 104 and meshes with the gear 64. This spur gear also meshes with another spur gear 106 which is fast on the shaft 93. Spur gear 106 in turn meshes with another spur gear 107 which is secured to shaft 96. It will thus be seen that the two shafts 93 and 96 are driven in opposite directions. The two gears 106 and 107 are preferably constructed of the same diameter so that the two rolls travel at the same rate of speed. Shafts 93 and 96 are held from endwise movement by means of the gears 106 and 107 secured to said shafts at corresponding ends thereof and by means of collars 89 and 90 secured to the other ends thereof.

The transverse cutter D consists of a rotating knife or blade 108 which is rigidly secured to a number of arms 109. These arms are formed with bosses 111 by means of which the same are mounted on the shaft 65 and rigidly secured thereto. The knife 108 cooperates with a stationary bed knife 112 which is mounted on a cross bar 113. Cross bar 113 is in turn secured to the two bearings 66 and 67 which journal shaft 65 so that the clearance of the knife 112 with respect to the knife 108 is maintained fixed. The bed knife 112 is disposed substantially at the elevation of tangency of the two rolls 91 and 92 so that the paper in passing through said rolls rides over the bed knife 112. As the shaft 65 rotates, the knife 108 cuts off sheets of paper of predetermined length, one of which is indicated by the reference numeral 114 and another of which is indicated by the reference numeral 115.

While the formed containers are being ejected from the wrapping mechanism M by the ejecting mechanism O it becomes necessary to prevent the feeding of paper through the machine. This is accomplished by the arresting device E previously referred to which is best shown in Figs. 3, 6, 7 and 8. Attached to the upright 19 is a stud 116 which has rotatably mounted upon it a cam 117. Integral with this cam is a spur gear 118 which meshes with a spur pinion 119 fast on the shaft 61. Cam 117 is hence positively rotated by shaft 47 and operates in synchronism with the feed mechanism and the transverse cutter. Attached to the uprights 18 and 19 are two bearings 121 and 122 which journal a rock shaft 123. The rock shaft 123 has secured to it two depending arms 124 and 125. Attached to the eccentric bushings 97 and 98 are plates 126 and 127 which have pivoted to them by means of bolts 128 links 129 and 131. These links are in turn pivoted to the arms 124 and 125 secured to rock shaft 123. It can readily be comprehended that as the rock shaft 123 is oscillated that the eccentric bushings 97 and 98 are turned and the shaft 96 moved toward and from the shaft 93 to vary the pressure between rolls 91 and 92. Movement of the rock shaft 123 and the two eccentric bushings 97 and 98 is procured by means of the plate 127 which has pivoted to it two rollers 132 and 133. The cam 117 is constructed with two stepped surfaces 134 and 135. Roller 132 follows the surface 135 while roller 133 follows the surface 134. The surface 135 is formed with a hump 136 having a leading edge 137 which moves the roller 132 upwardly as viewed in Fig. 6, which has the effect of moving the shaft 96 away from the shaft 93 and throwing the roll 92 out of engagement with the roll 91. On cam surface 134 is formed a receding edge 138 which is the end of a depression 139 in said cam surface 134. As the roller 132 climbs surface 137, roller 133 follows down the edge 138 and thereafter travels along the depression 139. At the other end of the depression is formed a leading cam surface indicated at 141 and when roller 133 arrives at this portion of the cam, said surface engages the roller 133 and the plate 137 swings in the opposite direction, moving roll 92 toward roll 91 and causing the feeding of the paper through the machine.

To prevent the accidental feeding of the paper 88 through the machine by rolls 91 and 92 while the arresting mechanism E is in operation, a gripping device 142 best shown in Figs. 3, 5 and 6, is used which is part of the arresting mechanism E. This gripping device consists of two gripper pads 143 which are attached to the lower ends of vertically slidable rods 144. Rods 144 are mounted for vertical reciprocating movement in a cross bar 145 attached to the two uprights 18 and 19. The rods 144 have collars 146 attached to the same near the upper ends and compression coil springs 147 encircle said rods, said springs being seated at their lower ends against the cross bar 145 and at their upper ends against the collars 146. These springs serve to urge the rods 144 upwardly. The cross bar 145 is positioned immediately above the bed 113 and when rods 144 are depressed, the pads 143 engage the upper surface of the paper 88 and press the same against the bed 113, holding the paper from further movement. The two rods 144 have secured to their outer ends pins 148 which pass through slots 149 in swinging arms 151. Arms 151 are attached to a rock shaft 152 which is journaled in bearings 153 secured to the uprights 18 and 19. By means of this construction, the two rods 144 operate in unison. Attached to the shaft 152 is an arm 154 which has pivoted to it at 155 a link 156. This link is in turn pivoted at 157 to a lever 158. A bolt 159 passes through the said lever and is screwed into the frame member 19 by means of which the said lever is pivoted. The outer end 161 of lever 158 is recessed as designated at 162 to receive a dog 163. Dog 163 is pivoted by means of a bolt 164 to the end 161 of lever 158. The pivot 164 of this dog is at right angles to the pivot 159 of said lever so that the said dog swings substantially in a horizontal plane. A compression coil spring 165 seated in a socket 166 in lever 158 engages the dog 163 urging the same outwardly as shown in full lines in Fig. 25. Movement of the dog in both extreme directions is limited by engagement of the dog with the walls of the lever 158 formed by the recess 162.

The dog 163 is moved by means of a construction best shown in Figs. 3 and 6. This construction comprises a frame 167 which is constructed with a horizontal frame member 168 and two depending vertical frame members 169 and 171. These frame members are welded or otherwise secured together. Frame member 168 is pivoted to the upright 19 by means of a bolt 172 which extends through said frame member and is screwed into said upright. The lower end of the frame member 169 has secured to it a cam 173 which is adapted to be engaged by a lug 174 on the cam 117. As the cam 117 rotates, lug 174 engages a cam surface 175 on cam 173 which moves said cam outwardly, swinging frame 168 about its pivot 172. This swings the frame member 171 in a direction toward the upright 19. Frame member 171 is so situated that the edge thereof engages the dog 163 and moves the same into its position shown in dotted lines in Fig. 25.

When the dog 163 has been moved to its dotted line position the said dog is in the plane of movement of a lug 176 formed on an arm 177 fast on shaft 65. This lug serves to swing the lever 158 downwardly which in turn through link 156 moves arm 154. Arm 154 being attached to rock shaft 152 swings the two arms 151 which moves rods 144 downwardly and brings the pads 143 into engagement with the paper, thereby gripping the paper against the bed 113 and depriving the paper of movement while the pads are so disposed.

Shaft 65 to which arm 177 is attached operates continuously. For this reason the lug 176 is so constructed that it passes the dog 163 when lever 158 is in its lowermost position. It hence becomes necessary to latch lever 158 in position during the operation of the arresting device E. For this purpose a pawl 178 is used which is pivoted to the depending frame member 171 of frame 168. This pawl is weighted to normally occupy the position shown in Fig. 6 and is constructed with an inclined edge 179. As the dog 163 passes downwardly, the said dog engages the edge 179 of pawl 178, swinging the same away from said dog. When dog 63 clears the pawl 178, said pawl swings back to normal position, holding the said lever 158 in downward position.

The cam 173 is constructed with an arcuate edge 181 which lies in continuation of cam surface 175. When the lug 174 passes along said edge 181, frame 167 is maintained in its position in which the lever 158 is depressed. When the lug 174 leaves the edge 181 of cam 173, the lever 167 swings backwardly to its normal position as shown in Fig. 3. This is accomplished by means of a spring 182 which is secured at one end to the frame member 169 and at its other end to the upright 19. Movement of the depending frame member 171 of frame 167 into normal position, disengages the pawl 178 from dog 163. This permits the arm 154 to swing upwardly and the two gripper pads 143 are disengaged from the paper resting upon the bed 113. The operation of the gripping mechanism 142 is performed simultaneously with the disengagement of the roll 92 with the paper so that uniform lengths of paper are cut off.

The conveyor G is best shown in Figs. 4 and 5. This conveyor comprises three rolls 184, 185 and 186 which are journaled in bearings 187 secured to the longitudinal frame members 20 and 30. Superimposing the roll 185 is another roll 188 which is similarly journaled. Gears 191 and 192 on the said rolls 185 and 188 cause the rolls to travel in unison. Secured to the two longitudinal frame members 20 and 30 are shaft hangers 193 which have pivoted to them a cross shaft 194. This shaft has secured to it a plurality of depending arms 195, each of which has pivoted to it a flanged idler 196. Forwardly of the roll 188 is a shaft 189 which is journaled in bearings 204 secured to the bearings 66 and 67. This shaft has attached to it a number of flanged pulleys 205. Conveyor G further comprises three aprons which are indicated collectively by the reference numerals 197, 198 and 199. These aprons are formed of individual spaced belts, the belts of apron 197 being indicated by the reference numeral 201, those of apron 108 by the reference numeral 202 and those of apron 199 by the reference numeral 203. The belts 201 pass about the two rolls 184 and 186 and about the idlers 196 carried on arms 195. These belts also pass between the two rolls 185 and 188. Belts 202 are disposed between the belts 201 and pass over rolls 185 and 186 and also over idlers 196. Belts 203 similarly are staggered with respect to the belts 202 and pass over the roll 186 and the flanged pulleys 205. The various rolls are so arranged that the upper runs of the aprons 197, 198 and 199 are substantially in a common plane at a position to receive the sheets severed from the unrolled paper 88 by means of the transverse cutter D.

The transmission for driving the various rolls of the conveyor G is best shown in Figs. 5 and 10. In the roll 184 is formed a groove 206. A belt 207 passes about this groove which serves as a pulley and about another pulley 208 secured to drive shaft 34, previously referred to. Apron 197 drives the roll 186 from roll 184 and roll 186 drives the two aprons 198 and 199. The two rolls 185 and 188 being geared together are driven by the apron 198. By means of this mechanism the sheets severed from the paper 88 are progressed along the machine up to the feed mechanism H to be presently described in detail.

While the paper is supported by the conveyor G the same is shifted in position by means of the skewing device F which is best shown in Figs. 1, 4 and 5. A square rod 209 is guided for transverse reciprocating movement in two guides 211 secured to the longitudinal frame members 20 and 30 and disposed beneath the same. This rod is held from rotation by means of said guides. One end of rod 209 has pivoted to it a lever 212 which in turn is pivoted by means of a bolt 213 to a bracket 214 secured to longitudinal frame member 30. A slotted connection is provided between the end of lever 212 and rod 209 so that the difference in movement of the said lever and arm is compensated for. Rod 209 has attached to it at the proper locality an upwardly extending finger 215 which is adapted to engage one of the lateral edges 216 of the severed sheet of paper 114 passing through the machine. The lever 212 is provided at its other end with a finger 218 which engages the other edge 217 of the sheet 114. As the rod 209 is reciprocated, fingers 215 and 218 travel in the opposite direction and skew the paper until the sheet occupies the position shown in Fig. 1.

For reciprocating rod 209 the following construction is employed. On the gear 59 attached to shaft 61 which was previously referred to, is mounted a lug 219. This lug is adapted to engage a cam 221 secured to an arm 222. Arm 222 is fast on rod 209. Cam 221 is so designed that the rod 209 travels in the proper direction to skew the paper as the gear 59 rotates. A tension coil spring 223 acting between finger 215 and the longitudinal frame member 20 returns the skewing mechanism to normal position.

In order to cut or trim the sheet 114 longitudinally with curved upper and lower edges, the paper is caused to travel in the arc of a circle through the longitudinal cutters I and J which are fixed relative to the frame of the machine. For this purpose the feed mechanism H is employed. This feed mechanism comprises two conical feed rolls 224 and 225 which are mounted on shafts 226 and 227. The shaft 226 is journaled in bearings 228 and 229 secured to the uprights 21 and 22 while the shaft 227 is similarly journaled in bearings 231 and 232 also secured to said uprights 21 and 22. Due to the taper of the two feed rolls 224 and 225 paper passing between the same is caused to travel over an arcuate path and cutters I and J function in a manner to shear the edges of the paper along arcs of a circle.

The rolls 224 and 225 are driven in the following manner: Attached to one end of shaft 227 is a bevel gear 233 which meshes with the bevel gear 42, being one of the gears of the gear cluster 38 previously referred to. At the other end of the shaft 227 is secured another bevel gear 234 which meshes with a bevel gear 235 fast on shaft 226.

The two longitudinal cutters I and J are identical in construction and are driven in the same manner from shaft 34. Therefore only cutter J will be described in detail. This cutter is best shown in Figs. 9 and 11 and comprises a casting 236 which is constructed with a yoke portion 237 having four bearings 238, 239, 241 and 242 connected to said yoke portion. The casting 236 is bolted to the upright 21 by means of bolts 243 which pass through a flange 244 integral with the yoke 237, and are threaded into said uprights. The two bearings 238 and 239 are spaced from one another and are in alignment and journal a shaft 245. Similarly bearings 241 and 242 are in alignment and are spaced from one another and journal a shaft 246. Secured to the end of shaft 245 is a circular shear 247 and cooperating therewith is another circular shear 248 which is secured to the end of the shaft 246. Between the bearings 238 and 239 and mounted on shaft 245 is a spur gear 249. This spur gear meshes with a similar spur gear 251 mounted on shaft 246 and disposed between the two bearings 241 and 242. A sprocket wheel 252 is formed on the hub of the gear 251. A chain 253 passes over the sprocket wheel 252 and over another sprocket wheel 254 secured to the shaft 34. The meeting edges of the two circular shears 247 and 248 are disposed at the line of tangency of the two feed rolls 224 and 225 so that the said shear cuts the paper as the paper is fed through the machine by feed rolls 224 and 225. In like manner the longitudinal cutter I simultaneously cuts the other edge of the sheet.

The transmission of the invention, previously referred to, includes in addition to the parts already described, a cam shaft 261 best shown in Figs. 1, 2 and 10 which is used for operating certain of the parts of the gluing device, the skip mechanism, the wrapping mechanism and the ejecting mechanism. This shaft is journaled in bearings 262 secured to the uprights 21 and 22. This shaft has attached to one end thereof a large gear 263. Mounted on a stud 264 secured to upright 21 is a spur pinion 265 which has attached to it a skew gear 266. The spur gear 263 on cam shaft 261 meshes with this spur pinion. Skew gear 266 in turn meshes with a skew gear 267 fast on the shaft 227. The various gears of the transmission are so proportioned that the cutter mechanism and the assembly mechanism operate in unison whereby every time a sheet is cut off, a sheet is wrapped on the mandrel. Shaft 261, however, rotates at a lesser rate of speed so that it makes a complete revolution every time the full number of sheets required to make a side wall have been assembled.

The sheets on leaving the feed mechanism H are arcuate as previously described. One such sheet is indicated by the reference numeral 115. This sheet is delivered upon the tray K previously referred to, which is best illustrated in Figs. 1, 10, 14 and 15. Tray K consists of a plate 255 arcuate in form which is constructed at the edge thereof, having the greater curvature, with an upwardly extending flange 256. Tray K is mounted on a bracket 257 which is attached to a square shaft 258. This shaft has round ends, not shown, which are journaled in bearings 259 secured to the uprights 21 and 22. The bracket 257 has attached to it a crank pin 268 which has journaled on it a roller 269. Roller 269 rests upon a drum type cam 271 which is mounted on and attached to the shaft 261. The cam 271 is constructed with a cylindrical surface 272 extending throughout the major portion of the circumference thereof and is also provided with a hump 273 providing an offset cylindrical surface 274. When the roller 269 rides on surface 272, the tray K is in a position to feed the cut sheet 115 to the gluing mechanism. When the roller 269 rides on the surface 274, the sheet is fed past the gluing mechanism and directly to the wrapping mechanism M, whereby the first sheet may be applied to the forming mandrel without being glued. The cam 271 and roller 269 form part of the skip mechanism N previously referred to.

Figure 14:
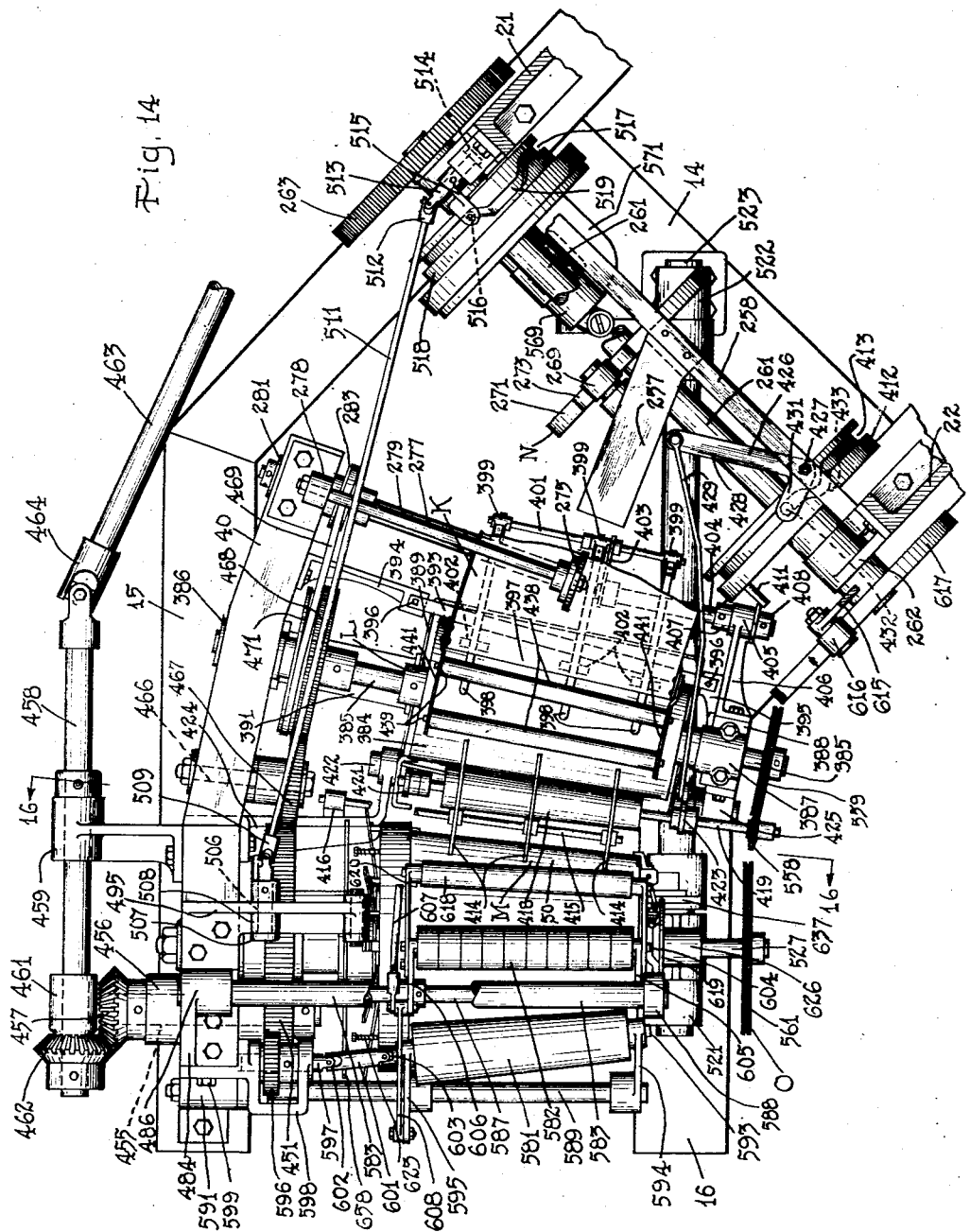
Fig. 14 is a fragmentary plan view of a portion of the machine, said view being rotated through an angle of 180 degrees as compared to Fig. 1 and being drawn to a larger scale.
Figure 15:
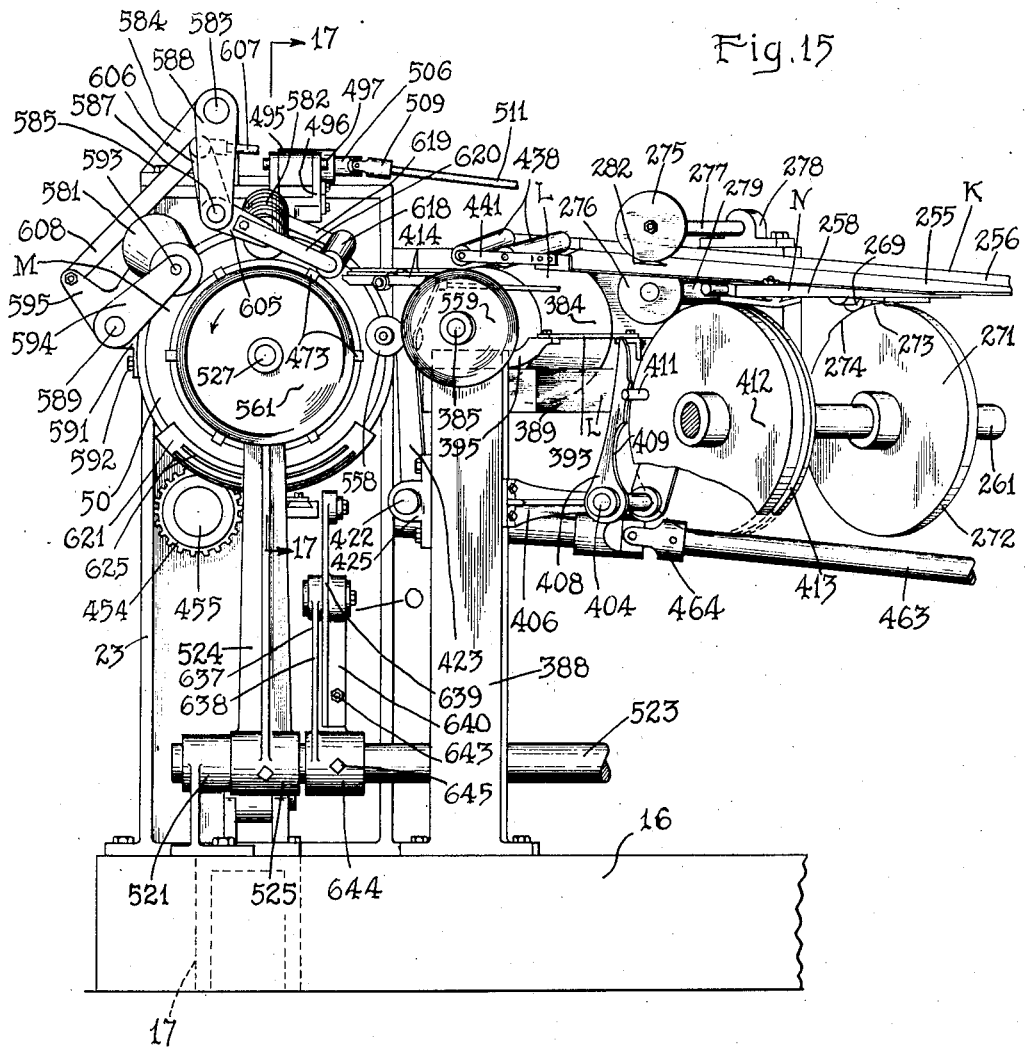
Fig. 15 is an elevational view of the structure shown in Fig. 14 and viewed from the nearest side thereof.

For the purpose of progressing the paper along the tray K, two feed rolls 275 and 276 are employed, best shown in Fig. 15. The roll 275 is journaled on the end of a stub shaft 277 which is attached to a support 278 secured to the cantilever frame member 40. Roll 276 is attached to a shaft 279 which is journaled in a bearing 281 formed in the cantilever frame member 40. The roll 276 extends through a slot 282 in the plate 255 of tray K and the said rolls are tangent at an elevation slightly above the upper surface of said plate so that the said rolls engage the sheet and feed the same whether the tray is in its upper or lower position. Shaft 279 has secured to it a pulley 283 (Fig. 14) and is driven in a manner to be presently described in detail.

The gluing device L consists of a conical glue roll 384 (Figs. 14 and 15) which is mounted upon a shaft 385, journaled at one end in a bearing 386 formed in cantilever frame member 40. The said shaft is journaled at its other end in another bearing 387 formed in an upright 388 mounted upon the longitudinal frame member 16 of bed 10. The glue roll 384 is positioned immediately above a glue receptacle 389. This glue receptacle is supported at one end by means of a bracket 391 which is secured to the cantilever frame member 40. The other end of the glue receptacle 389 is supported by means of another similar bracket, not shown, which is attached to the upright 388. The glue roll 384 dips into the glue contained within glue receptacle 389 and as the said roll revolves, becomes coated with glue.

For the purpose of maintaining an even coating of glue upon the roll 384, a scraper 393 is employed which consists of a bar of metal having an edge positioned closely to the surface of the roll 384. This scraper is attached at one end to a bracket 394 which is secured to cantilever frame member 40 and is attached at its other end to another bracket 395 which is attached to upright 388. Scraper 393 is secured to these brackets by means of screws 396 which pass through radial slots or enlarged openings in said scraper. By shifting the scraper radially along these bolts the scraper may be adjusted toward and from the roll 384 to vary the thickness of the coating of glue applied to the same.

In the wrapping of the first sheet about the mandrel, it becomes desirable, as previously stated, to prevent gluing of the said sheet. This is partly accomplished by raising the tray K through the action of cam 271 and roller 269. When the roller 269 engages the hump 273 of cam 271, the leading edge 397 of said tray is raised above the elevation of the highest point of the glue roll 384. This construction forms part of the skip mechanism N.

Acting in conjunction with the tray K are three fingers 398 which are disposed beneath tray K and which are attached to bosses 399 which in turn are secured to a transverse shaft 401. These fingers constitute another part of the skip mechanism N and are guided at their other ends by means of keepers 402 which are attached to the underside of the tray K at the end 297 thereof. The shaft 401 is attached to the end of an arm 403 which in turn is rigidly secured to a shaft 404. Shaft 404 is journaled in a bearing 405 formed on the end of a bracket 406 which is secured to upright 388. A collar 407 is disposed on one side of the bearing 405 and restrains longitudinal movement of shaft 404 within the bearing 405. A lever 408 is attached to the shaft 405 on the other side of bearing 405 and serves the same purpose as collar 407. This lever has a cam surface 409 which is adapted to engage a pin 411 mounted on a cam 412. Cam 412 is mounted on cam shaft 261 and further contains a cam groove 413 which serves an added purpose to be subsequently referred to. When pin 411 engages the cam surface 409 of lever 408, said lever is swung toward the left as viewed in Fig. 15 which has the effect of sliding the fingers 398 along the keepers 402 and from a position in back of the said edge 397 of tray K to a position shown in full lines in Fig. 14. In the latter position, the fingers are above the highest point of the glue roll 384 and prevent the paper from coming in contact therewith.

The paper on leaving the fingers 398 on the glue roll 384 is directed upon three horizontally extending supports 414 which are attached to a transverse bar 415. This bar is secured at one end to a bracket 416 attached to another bracket 424 to be presently described in detail, which is secured to cantilever frame member 40. The supports 414 are stationary with respect to said bar and direct the paper to the wrapping mechanism M as will be presently more fully described.

For the purpose of forcing the paper in contact with the glue roll 384, two presser rolls 438 are employed which are constructed with trunnions 439 journaled in two longitudinally extending bars 441. These bars are attached to the tray K and extend outwardly therefrom so that the two rolls 438 are spaced equally on opposite sides of the uppermost portion of the roll 384. When the tray K is in its lowermost position, the two presser rolls 438 urge the sheets of paper against the glue roll and when the tray K is raised, said rolls are spaced from the glue roll 384, permitting the sheet to travel from the fingers 398 to the supports 414 independently of the glue roll.

In order to coat the ends of the first sheet applied to the mandrel with glue, an auxiliary glue roll 418 is employed, which is mounted upon a shaft 419. Shaft 419 is journaled at the end of an arm 421 which is attached to a shaft 422. The other end of shaft 419 is similarly journaled at the end of another arm 423 which is also attached to shaft 422. Shaft 422 is itself journaled at one end in the bracket 424 previously referred to which is attached to the upright 23. The other end of shaft 422 is journaled in a bearing 425 which is attached to upright 388. Normally auxiliary glue roll 418 contacts with the surface of glue roll 384 and is thus maintained coated with glue. When the shaft 422 is rocked, this roll is moved toward the mandrel and engages the sheet on the mandrel and coats the portion thereof with which it comes in contact.

The shaft 422 is rocked in the following manner: Attached to the square shaft 258 which supports the end of tray K is a bell crank 426 (Fig. 14) which is pivoted to said square shaft by means of a bolt 427. This bell crank has an arm 428 which is connected by means of a link 429 with the arm 423 supporting roll 418. Bell crank 426 is constructed with another arm 431 which has secured to it a depending pin 432 adapted to enter the slot 413 in cam 412. This slot is constructed with an offset portion 433 which causes the swinging of bell crank 426 when pin 432 enters such portion of the slot. By means of the groove 413 auxiliary glue roll 418 is moved toward and from the mandrel 50 and into and out of engagement with the glue roll 384.

The mandrel 50 forms part of the wrapping mechanism M. This mandrel is conical in form having a conical wall 434 and an end wall 435 connected therewith. The end wall 435 is constructed with a boss 436 which is bored to receive a sleeve 437. Mandrel 50 is held mounted on the sleeve 437 by means of set screws 442. Sleeve 437 is rotatably mounted upon an axle 443 which at one end is constructed with a reduced threaded portion 444 concentric with the axle proper. The axle 443 extends into a boss 445 formed on the upright 23, which boss is provided with a bore 446 to receive said axle and at its end with a reduced bore 447 through which the threaded portion 444 of axle 443 extends. A nut 448 screwed upon the end of the threaded portion 444 engages the boss 445 upon the exterior thereof and holds the axle 443 rigidly secured to the upright 23. A collar 449 attached to the end of axle 443 by means of a set screw 440 holds the mandrel 50 in position upon said axle.

Mandrel 50 is rotated by means of a spur gear 451. This spur gear is constructed with a hub 452 through which the sleeve 437 extends and is secured to said sleeve by means of a set screw 453. The gear 451 meshes with a spur pinion 454. Spur pinion 454 is secured to a shaft 455 (Fig. 14) which is journaled in a bearing 456 cast on the upright 23. This pinion abuts against one side of bearing 456. A bevel gear 457 is secured to the other end of shaft 455 and abuts against the other end of the bearing 456 thereby holding the shaft 455 from longitudinal movement within its bearing. Extending along the cantilever frame member 40 is a longitudinal shaft 458 (Fig. 2) which is journaled in two bearings 459 and 461, both secured to the upright 23. The shaft 458 has attached to it a bevel gear 462 which meshes with the bevel gear 457 on shaft 455. Shaft 458 is connected to a floating shaft 463 by means of a universal joint 464. This shaft in turn is connected by means of another universal joint 465 with the longitudinal shaft 47 previously referred to. By means of this transmission the mandrel 50 is driven in a countter-clockwise direction, as viewed in Fig. 15.

The shaft 385 supporting glue roll 384 is driven from the spur gear 451 which drives the mandrel 50. A stub axle 466 is bolted to the cantilever member 40 and rotatably supports a spur gear 467 which meshes with gear 451. This gear in turn meshes with a spur gear 468 on shaft 385. The gears 467 and 468 are cut on a slight skew so that the same mesh properly with one another and compensate for the angularity between the cantilever frame member 40 and upright 23.

The feed rolls 275 and 276 are driven in the following manner: Attached to the shaft 279 is the pulley 283 previously referred to. A belt 469 passes over this pulley and over another pulley 471 fast on shaft 385. Shaft 279 is driven at a speed such that the peripheral velocity of the feed rolls 276 is slightly greater than the rate of travel of the paper so that compensation is made for slippage between the said feed rolls and the paper. Feed roll 275 merely functions as an idler and maintains the paper in contact with the feed roll 276, which is the drive roll of the pair.

As previously explained the paper on leaving the supports 414 is directed upon the surface of the mandrel 50. As the paper is wrapped about the mandrel the same is held in position by means of two sets of gripping fingers 472 and 473. The fingers 472 are disposed at the larger end of the mandrel 50 while the fingers 473 are disposed at the smaller end of the same. These fingers and the method of operating the same will now be described in detail.

Encircling the larger end of the mandrel 50 is a ring 474 (Figs. 19 and 20) which is held attached thereto by means of screws 475 (Fig. 17). This ring is provided at intervals about its inner periphery with longitudinally extending slots 476 which snugly receive fingers 472 and form guideways for guiding the same for longitudinal movement of said fingers with respect to the surface of the mandrel 50. The slots 476 are of a radial dimension greater than the thickness of the fingers so that the fingers may move toward and from the mandrel and the fingers are urged toward the surface of the mandrel 50 by means of pins 477 which extend through the ring 474 and engage said fingers upon the upper surface thereof. Pins 477 are urged radially inwardly by means of leaf springs 478 secured to the ring 474 upon its periphery. Fingers 472 project outwardly beyond the wall 435 of mandrel 50 and are provided at their extreme ends with heads 479 by means of which the said fingers may be manipulated. The fingers 472 within the slots 476 are cut away as indicated at 481 to form cam surfaces 482 which are adapted to engage cams 483 secured to the mandrel 50 by means of screws 484. These cams are disposed within the slots 476 and in close proximity to the ends of said slots. When the fingers 472 are in the position shown in Fig. 20, the same are receded within the slots 476 and the paper may be wound upon the mandrel without interference. When these fingers are projected outwardly, the cam surfaces 482 thereof slide along the cams 483 and said fingers engage the surface of the paper wrapped about the mandrel and grip the same, holding the paper in place. This is accomplished by means of the springs 478 which press against the pins 477 and urge the fingers toward the mandrel.

Figure 19:
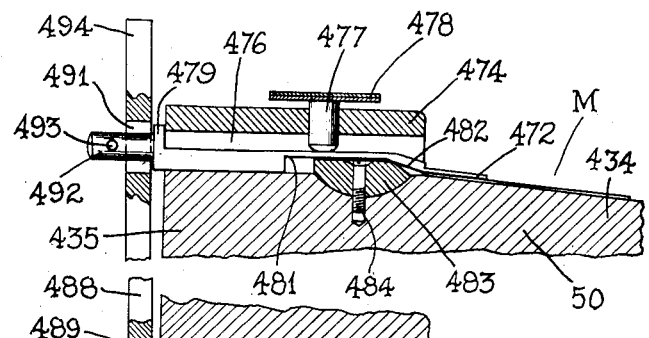
Fig. 19 is a fragmentary elevational sectional view taken on line 19—19 of Fig. 18.
Figure 20:
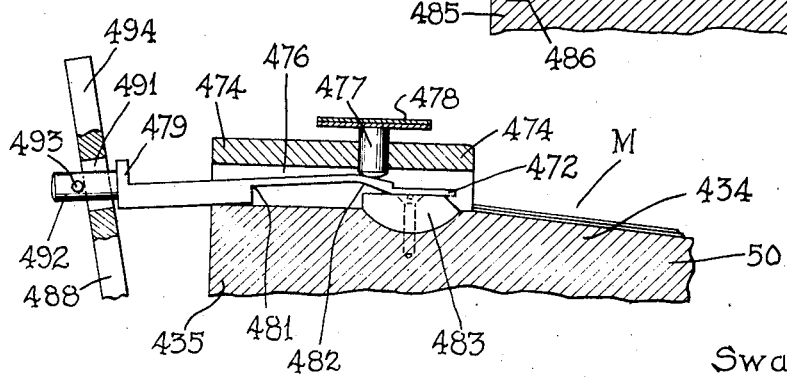
Fig. 20 is a view similar to Fig. 19 showing the parts in altered position.
Figure 22:
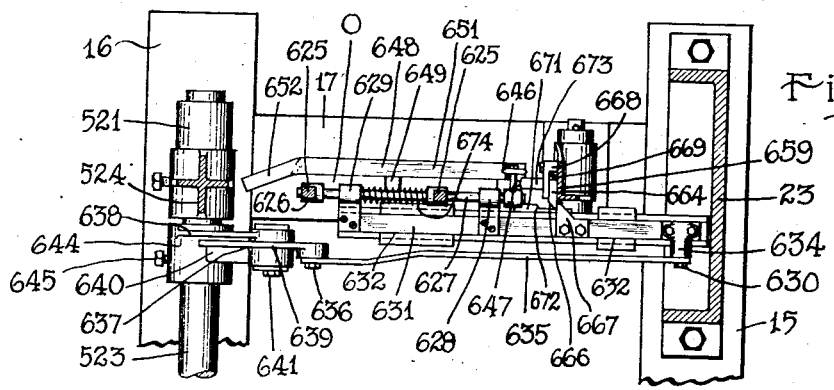
Fig. 22 is a fragmentary plan sectional view taken on line 22—22 of Fig. 16.
Figure 23:
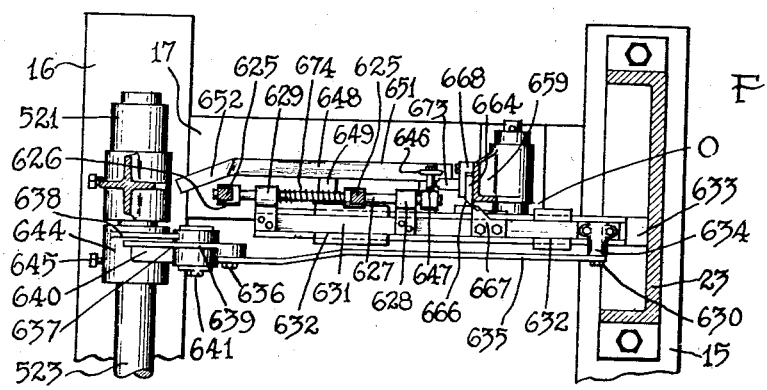
Figs. 23 and 24 are views similar to Fig. 22 showing the parts in altered relation.

In the end wall 435 of mandrel 50, as best shown in Fig. 19, is formed an auxiliary hub 485 which is provided with a circumferential groove 486. Through this hub extend pins 487 which pass through the groove 486 and which are located radially inwardly from the slots 476 in ring 474. A number of rods 488 are employed which correspond in number to the fingers 472 and which are bifurcated at their ends as indicated at 489 to straddle the pins 487. These rods are constructed with slots 491 through which shanks 492 on the ends of the heads 479 of fingers 472 extend. Cotter keys 493 pass through these shanks and hold the ends of the rods freely attached to the heads 479. Shifting of the fingers 472 is accomplished through engagement of a cam mechanism with the protruding ends 494 of the rods 488, which is shown in detail in Figs. 14, 16 and 18.

Secured to the upper portion of the upright 23 is a bracket 495 which extends up to the end wall 435 of mandrel 50. This bracket has pivoted to it by means of a pin 497 a depending bifurcated arm 496, said pin extending jointly through said arm and bracket. The lower end of arm 496 has attached to it a split cam 498 which is constructed with a slot 499 extending through the same. Slot 499 is narrower at one end indicated at 501 and is considerably wider at its other end as indicated at 502 and is formed with tapering surfaces 503 connecting the portions 501 and 502. This cam is adapted to engage the ends 494 of the rods 488 and when said cam is in one position, operates to swing the rods inwardly and cause fingers 472 to move outwardly through the slots 476 and to engage the paper wrapped upon the mandrel 50 and when in another position to swing the rods outwardly.

The arm 496 is swung about the pin 497 by means of a link 504 which is pivoted to a swinging arm 505. This arm is attached to a shaft 506 journaled in a bearing 508 formed in the bracket 495. Shaft 506 is provided at one end with a collar 507 integral therewith which engages the bearing 508 and restrains movement of said shaft in one direction. This shaft is connected by means of a universal joint 509 with a floating shaft 511. This shaft is in turn connected by means of a universal joint 512 with another shaft 513. Shaft 513 is journaled in a bearing 514 secured to upright 21. This shaft has attached to it a depending arm 515 which is provided with a pin 516 depending therefrom best shown in Fig. 10. Pin 516 travels in a slot 517 in a cam 518 mounted on cam shaft 261. The slot 517 is constructed with an offset portion 519 which causes the arm 515 to swing and thereby produces movement of the shaft 513, shaft 511 and shaft 506, whereby cam 498 is shifted to the right or left as viewed in Fig. 18. By means of cam 498 the fingers 472 are caused to grip the first sheet of paper applied to the mandrel and as the second sheet is applied, the said fingers are disengaged and remain disengaged throughout the further wrapping of sheets in the formation of the container.

Figure 21:
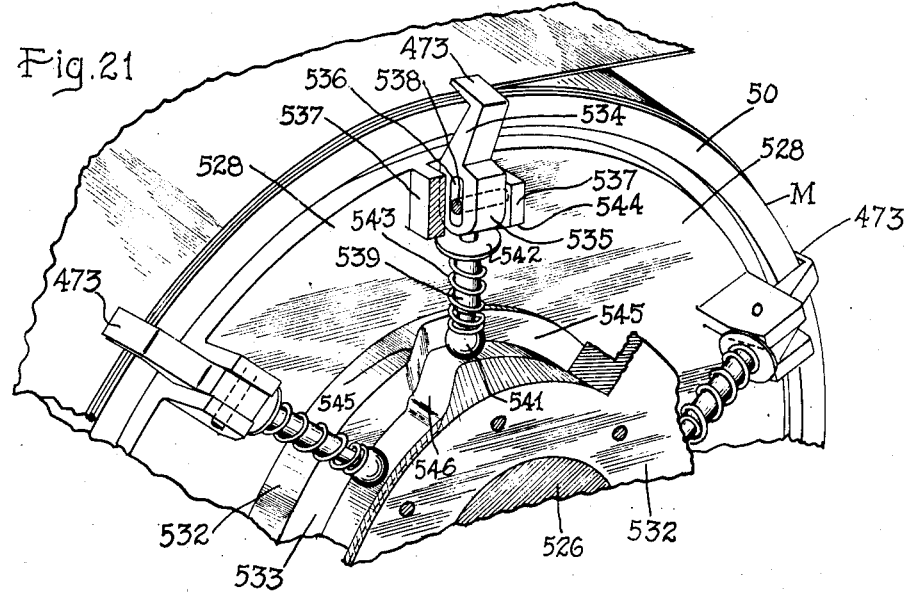
Fig. 21 is a perspective view of a portion of the structure shown in Fig. 17 and taken on line 21—21 of Fig. 17.

The gripper fingers 473 are supported and operated in a manner best shown in Figs. 15, 17 and 21. On the longitudinal frame member 16 of bed 10 is provided a bearing 521. In alignment with this bearing is another bearing 522 (Fig. 10) which is mounted on the transverse frame member 14 of bed 10. These bearings journal a rock shaft 523 which has secured to it a swinging standard 524. Standard 524 is provided at its lower end with a boss 525 which is bored to receive the shaft 523 and which is rigidly secured thereto. The upper end of the standard 524 as shown in Fig. 17 is provided with a bearing 526 in which is journaled a shaft 527. Shaft 527 has secured to it on one side of the bearing 526 a disk 528 which engages said bearing and on its other side a collar 529 which also engages said bearing. These parts hold the shaft from longitudinal movement with respect to the bearing. The bearing 526 is constructed with a flange 531 which has attached to it a stationary ring cam 532. This cam is provided with a groove 533, best shown in Fig. 21. Disk 528 carries the fingers 473 and is driven by the mandrel 50 as will be presently described and as the same rotates the cam groove 533 serves to manipulate the fingers in the desired manner.

The fingers 473 are all similar in construction and similarly mounted. Only one thereof will hence be described in detail. This finger is constructed with a shank 534 which terminates in a head 535. Head 535 has an elongated slot 536 therein by means of which the finger 473 is supported and guided for movement. On the disk 528 at regular intervals about the periphery thereof are provided forked supports 537 between which the heads 535 are disposed. A pin 538 extends through the supports 537 and through the slot 536 and support the finger 473 for both radial sliding movement and swinging movement about the axis of said pin. Issuing outwardly from the head 535 is a spindle 539 which terminates in a ball 541 adapted to enter the slot 533 of cam 532. A washer 542 encircles the spindle 539 and is urged against the support 537 by means of a compression coil spring 543 which also encircles said spindle and bears against the ball 541. The supports 537 are constructed with beveled edges 544 against which the washers 542 bear so that springs 543 act to hold the fingers into engagement with the paper wrapped about the mandrel.

The groove 533 of cam 532 is constructed with an offset 545 which causes the fingers 473 to swing about the pins 538. In this groove is also provided a hump 546 which raises the balls 541 and correspondingly raises the fingers 473. The action of the cam 532 is as follows: In normal position the fingers 473 are disposed considerably outwardly from the surface of the mandrel 50 and longitudinally beyond the marginal edge of the mandrel. As the paper is wrapped upon the mandrel, the fingers 473 are first swung inwardly to overlie the marginal portions of the paper and are thereafter moved radially toward the mandrel to grip the same.

The disk 528 is driven in the following manner: Set into the outer end of the mandrel 50 is a drive ring 547 which is received within a recess 548 in said mandrel and which is held in position therein by means of counter-sunk screws 549. This ring is provided with a series of circumferentially arranged sockets 551. On the disk 528 is a boss 552 which slidably supports a drive pin 553. This pin is provided intermediate its ends with a collar 554 integral therewith and is urged outwardly toward the ring 547 by means of a compression coil spring 555 encircling said pin and seated at one end against the boss 552 and at its other end against the collar 554. A plate 556 forms a guide for the end of the pin 553 and also serves as a stop for limiting the outward movement of the pin toward the ring 547. This plate is secured to disk 528 by means of screws 557. When the standard 524 is moved into its position shown in Fig. 17, pin 553 is brought into engagement with one or the other of the holes 551 and a drive is effected between disk 528 and the mandrel 50, whereby shaft 527 is rotated.

The auxiliary glue roll 418 is driven in the following manner: On the end of the shaft 419 is a friction gear 558. This gear is V-shaped and is adapted to mesh with a complemental friction gear 559 mounted on shaft 385 which supports the glue roll 384. Gear 559 is constructed with a V groove to receive the gear 558, whereby the said gear is driven and the glue roll 418 rotated when the same is in contact with the glue roll 384. A similar gear 561 is attached to the end of the shaft 527 and is adapted to drive the glue roll 418 when the same is in contact with the paper on mandrel 50. The glue roll 418 is then alternately driven by means of the gears 559 and 561 as it shifts from the glue roll 384 to the mandrel 50 and vice versa.

Figures 12, 13:
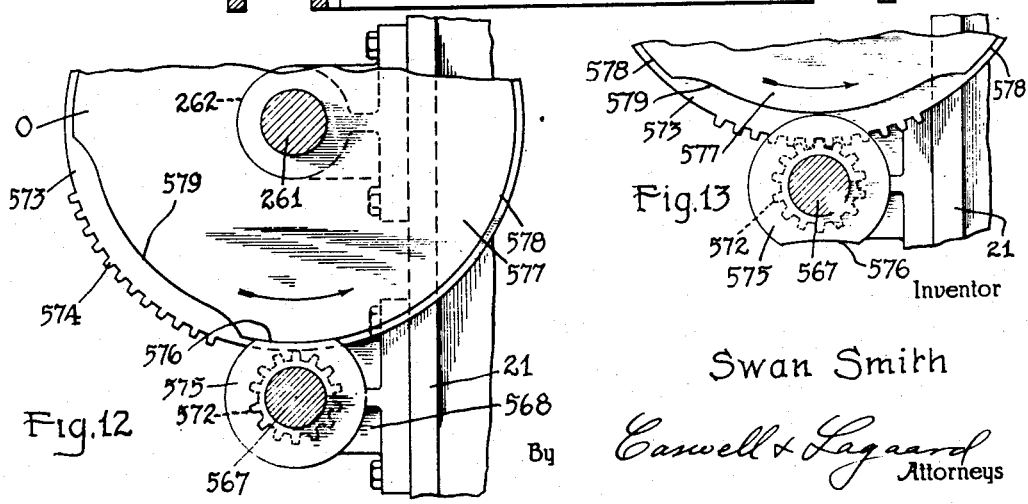
Fig. 12 is a fragmentary elevational sectional view taken on line 12—12 of Fig. 10.
Fig. 13 is a view similar to Fig. 12 showing the parts in altered position.

The swinging standard 524 is moved to and from the mandrel 50 by means best shown in Figs. 10 and 16. At the end of the shaft 523 is provided an arm 562 which is rigidly secured to said shaft. This arm has pivoted to it a link 563 which is constructed with a ball and socket connection 564 between the said arm and link. Another ball and socket connection 565 at the other end of the link 563 connects said link with a crank 566 attached to a shaft 567. Shaft 567 is journaled in a bearing 568 attached to upright 21 and in another bearing 569 connected to bearing 568 by means of a yoke 571 illustrated in Fig. 14. Mounted on shaft 567 is a spur pinion 572. This pinion is adapted to mesh with a mutilated gear 573 on the cam shaft 261. The construction of gear 573 is shown in Figs. 12 and 13. Gear 573 has teeth 574 disposed about its periphery at a certain portion of the circumference thereof which has the effect of rotating shaft 567 when the said teeth mesh with the teeth of the spur pinion 572. When these teeth come in mesh, shaft 523 is rocked and the swinging standard 524 swung from one position to the other.

For maintaining the shaft 567 in fixed position during its period of rest, a disk 575 is employed which is attached to shaft 567 adjacent the spur pinion 572. This disk is cut away along an arc of a circle, as indicated at 576 which is concentric with the circumferential edge 578 of another disk 577 attached to cam shaft 261 adjacent the mutilated gear 573. During a portion of the travel of the shaft 261 the surface 578 of disk 577 rides along the surface 576 of disc 575 and shaft 567 is held in position. Disk 577 is cut away as indicated at 579 which permits of rotating shaft 567 when the said cut away portion comes opposite disk 575. At this particular locality pinion 572 meshes with the teeth 574 of gear 573 and the shaft 567 is caused to rotate. The gears 572 and 573 and the disks 577 and 575 form a Geneva movement in which the shaft 567 has a single period of rotation and a single period of rest for each turn of the shaft 261.

In order to press the sheets of paper together after the same have been wound upon the mandrel 50, two ironing rolls 581 and 582 are employed of which the roll 581 is conical in shape and which are supported in the following manner: A cylindrical bar 583 is attached to the upright 23 by means of a bracket 584 which is bolted to the upright 23 by means of bolts 585. Bracket 584 is constructed with a boss 586 in which the bar 583 is rigidly secured. This bar extends outwardly from the upright 23 and across the machine and forms a support for a shaft 587 disposed immediately below the bar 583. This shaft is journaled in a bearing 580 formed in the upright 23 and at its other end in a shaft hanger 588 which is rigidly secured to the bar 583. In addition to this shaft, another shaft 589 is employed which is journaled at one end only in a bearing 591 which is bolted to the upright 23 by means of bolts 592 (Fig. 15). The roller 581 is provided with a shaft 593 which is journaled at one end in an arm 594 secured on the shaft 589. The shaft 593 of roller 581 is journaled at its other end in a bell crank 595 which is also secured to the shaft 589. Shaft 593 is driven by means of a spur gear 596 which is attached to a short shaft 597. Spur gear 596 meshes with the spur gear 451 which is mounted on the sleeve 437 and drives mandrel 50. The shaft 597 is journaled in a U-shaped support 598 which is secured to the upright 23 by means of bolts 599 (Fig. 14). The shaft 597 is connected to the shaft 593 by means of a floating shaft 601 and two universal joints 602 and 603. By means of this construction the roller 581 may be moved toward and from the mandrel 50 by the swinging of the shaft 589, through the bell crank 595. At the same time the roller 581 is positively driven from the gear 596.

The roller 582 is supported in a similar manner. This roller is provided with a shaft 604 which is journaled in an arm 605 and a bell crank 606 similar to the arm 594 and the bell crank 595. This arm and bell crank are attached to the shaft 587 in the same way. For raising the two rollers 581 and 582 away from the mandrel 50 a connecting rod 607 is employed which is connected to the bell crank 606. This bell crank in turn is connected to the bell crank 595 by means of a link 608. The connecting rod 607 is connected to an arm 609 (Fig. 10) which is attached to a shaft 611. This shaft is journaled in two bearings 612 and 613 secured to the uprights 21 and 22 by means of bolts 614. Shaft 611 has secured to it another arm 615 which depends therefrom and which rotatably supports a cam roller 616. This cam roller is adapted to engage a cam 617 secured to shaft 261 which is driven as previously explained. As the shaft 261 rotates connecting rod 607 is reciprocated and the two rollers 581 and 582 are moved toward and from the mandrel 50.

In order to direct the paper from the gluing machine L upon the mandrel 50, a guide roller 618 is employed which is pivoted to two arms 619 and 620 which are attached to the arm 605 and the bell crank 606. This roller moves with the roller 582 and when the rod 607 is manipulated roller 618 is moved away from the mandrel 50 so as to permit of the removal of the formed tube from the mandrel.

The ejecting mechanism O is best shown in Figs. 16, 17, 22, 23 and 24. This mechanism includes a pan 621 arcuate in form which fits below the mandrel 50 and is constructed with a lip 622 at its inner end in close proximity to the surface of the mandrel. This pan receives the formed tub, moves the same off from the mandrel and releases the tub after the tub has been disengaged from the mandrel. Operating in conjunction with the pan 621 are a number of presser rods 623 which are carried by the mandrel and which are constructed with heads 624 which engage the edge of the formed tub and forcefully initiate the ejecting movement of the tub. These various parts and the method of operating the same will now be described in detail.

The pan 621 is constructed of sheet metal and is attached to two yokes 625. These yokes are provided at their lower ends with bosses 626 which receive a shaft 627. These bosses are rigidly secured to the said shaft. Shaft 627 is slidably and rotatably mounted in two bearings 628 and 629 which are attached to a slide bar 631. Slide bar 631 is shaped dovetailed in cross section and is slidably mounted in a dovetailed groove 632 formed in a bracket 633 secured to the upright 23. The groove 632 is parallel with the axis of the mandrel 50 and the bracket 633 is of such length that the pan 621 may be slid entirely beyond the end of the said mandrel to free the tub resting upon said pan from the mandrel.

The slide bar 631 is reciprocated in the following manner: Attached to one end of said slide bar is a lug 634 which has pivoted to it at 630 a link 635. This link in turn is pivoted at 636 to a jointed lever 637 constructed in two sections 638 and 639. These sections are pivoted relative to one another as indicated at 641 and the two sections are yieldingly held in alignment by means of a compressor coil spring 642. This coil spring fits over an arcuate rod 643 which is attached to an extension 640 on the section 639 and which slides in the section 638. This construction affords a yielding connection between the slide bar 631 and the operating mechanism therefor so that in the event that a tub becomes stuck to the mandrel the mechanism will not be injured. The lever 637 is constructed with a boss 644 which is secured to the shaft 523 by means of a set screw 645. It will readily become apparent that as the shaft 523 is oscillated the arm 637 is moved with it and the slide bar 631 is reciprocated back and forth.

The pan 621 is held in concentric relation with respect to mandrel 50 by means of a wheel 646 (Fig. 22) which is journaled on a stub shaft 647 attached to the end of shaft 627. Wheel 646 travels along a track 648 which is supported from the bracket 633 by means of two arms 649 extending outwardly from said bracket. The track 648 has a portion 651 which is parallel with the slide bar 633 and another portion 652 depending therefrom. While the wheel 646 is traveling along the portion 651, pan 621 is maintained concentric with the axis of mandrel 50. As soon as this wheel reaches the portion 652 of track 648, the pan 621 tilts and the tub rolls off from the pan. The portion 652 of the track is so disposed that when such action of the pan occurs, the tub has been completely freed from the mandrel.

To initiate movement of the tub from the mandrel 50 a number of presser rods 623 are utilized which are best seen in Fig. 17. Any number of these rods may be employed and the same are mounted for sliding movement in the ring 474 which is attached to the mandrel 50 by means of screws 475. These rods have heads 624 secured to the same, which heads normally extend into recesses 655 in said ring. The other ends of the rods 623 are threaded to receive nuts 656. Between nuts 656 and the ring 474 are disposed compression coil springs 657 which urge the heads 624 into the recesses 655.

The presser rods 623 are simultaneously moved by means of a presser ring 658. This ring is secured to a swinging upright 659 by means of bolts 661. The swinging upright 659 is pivoted by means of a shaft 662 secured thereto, which is journaled in a bearing 663 attached to frame member 17 (Fig. 16). This swinging upright is moved in the following manner: A dog 664 is pivoted to the upright 659 by means of a bolt 665 (Fig. 17). This dog is constructed with a beveled edge 666 best shown in Figs. 22, 23 and 24, and is adapted to swing toward and from the slide bar 631. Attached to the slide bar 631 is a lug 667 which projects beyond the edge of the same and in the path of movement of the said dog 664. A keeper 668 attached to upright 659 maintains the dog 664 in position and takes the strain from the pivot bolt 665 thereof. Dog 664 is urged outwardly by means of a spring 669 and is normally engaged by the lug 667. As the slide bar 631 travels outwardly, arm 659 through lug 667 and dog 664 is moved toward the mandrel 50 and forces the presser rods 623 inwardly. The heads 624 of these presser rods engage the edge of the formed tub and initiate movement of said tube, at the same time loosening the tub from the mandrel.

It will be noted that the ring 658 and the presser rods 623 have only a limited movement. To terminate movement of these parts a cam 671 is employed which has a beveled cam surface 672 adapted to engage the bevel surface 666 of dog 664. This cam is attached to the bracket 633. When the dog 664 reaches this cam the same is moved outwardly and away from the lug 667 thereby freeing the lug from the dog and permitting the swinging upright 659 to move backward to its normal position.

Figure 24:
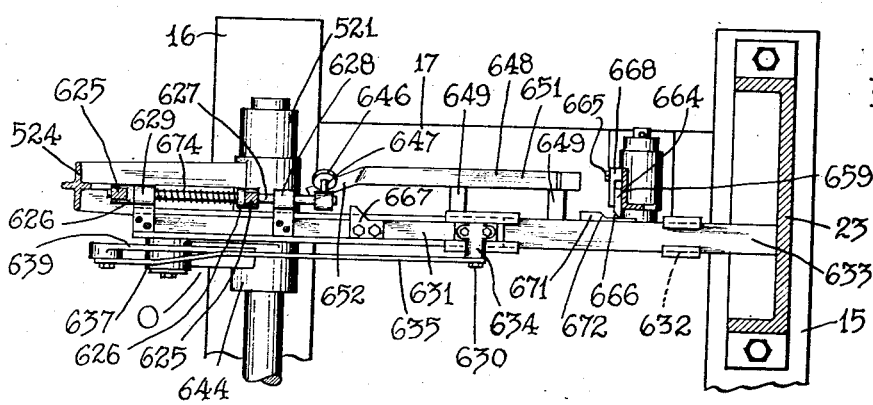

The shaft 627 carrying the pan 621 is moved by means of the swinging upright 659 through a finger 673 (Fig. 17) which is attached to said upright and which engages shaft 647. While the swinging upright 659 is traveling, pan 621 travels with it remaining in a position below the mandrel to receive a tub freed therefrom. Encircling the said shaft 627 and disposed between one of the bosses 626 and the bearing 629 is a compression coil spring 674. As soon as the swinging upright 659 is freed this coil spring moves the pan rearwardly until the boss 626 engages the bearing 629 as shown in Fig. 24. This rearward movement of the pan occurs very rapidly and causes the lip 622 of pan 621 to move back of the edge of the tub freed by the presser rod 623. Thereafter the tub is progressed outwardly from the mandrel by means of said lip until the tub is rolled off from the pan 621 as previously described.

The operation of the invention is as follows: Upon the energizing of motor 24 all of the rotating shafts of the invention are set in motion and rotate continuously. As long as the two rolls 91 and 92 are forced in contact with one another through the eccentrics 97 and 98 of the feed mechanism C, said rolls produce feeding of the paper 88 into the machine. Each time the knife 108 passes the knife 112 a sheet is cut off and forwarded by the conveyor G. These sheets are then turned at an angle by the skewing device F which includes the fingers 218 and 215. The skewed sheets are carried by the conveyor G to the feed mechanism H which causes the sheets to travel on the arc of a circle. While so traveling, the two cutters I and J trim the margins of the sheet giving the sheet an arcuate form and deposit the sheets upon the tray K. From the tray K the sheets are run through the gluing device L and finally fed to the mandrel 50 of the assembling or wrapping mechanism M where the sheets are glued to one another. By means of the presser rolls 581 and 282, the sheets as they are fed to the mandrel are pressed firmly against one another and a rigid construction formed. As the sheets are fed onto the mandrel the gripper fingers 472 and 473 are successively caused to engage the sheets and hold the same in position. After the desired number of sheets have been applied, the arresting device E is brought into action which terminates the feeding and cutting off of sheets. During the interval of rest of the sheet feeding and cutting mechanism the ejecting mechanism O is brought into action which forcibly ejects the formed structure from the mandrel and moves the structure clear of the mandrel discharging the same therefrom. Upon the return of the parts of the ejecting mechanism to normal position, resumption of the feeding and cutting of sheets takes place. However, the first sheet applied to the mandrel is not glued. This is accomplished by the skip mechanism N which raises the tray K and holds the first sheet above the glue rollers. Glue is, however, applied to one end of this sheet to secure the ends thereof together. This is accomplished by means of the auxiliary glue roll 418 which alternately operates between the glue roller 384 and the mandrel 50. It will be noted that the shaft 116 is driven at a reduced rate of speed so that the arresting mechanism which is controlled thereby operates at the proper time to stop the feeding of paper to the mandrel. It will also be noted that the skip mechanism N and ejecting mechanism O are controlled by the shaft 261 which also travels at a reduced rate of speed, whereby these functions are procured at the proper times to make the formation of the receptacle side walls continuous.

The advantages of my invention are manifest. A single machine is provided by means of which side wall structures for containers are automatically constructed. By means of my improved invention laminated side walls may be formed. With my invention the operation of the parts is positive and uniformity and accuracy in the product results. With my machine it becomes unnecessary to either feed the paper to the machine or to remove the formed product therefrom. By the arrangement of the parts an extremely substantial and rigid structure is provided whereby the functions thereof may be successfully carried out.

Changes in the specific form of my invention, as herein disclosed, may be made within the scope of what is claimed without departing from the spirit of my invention.

Having described my invention, what I claim as new and desire to protect by Letters Patent is:

1. In a machine of the class described, a transverse cutter for severing sheets from a continuous strip, feed means for feeding the strip to the cutter, assembling means for successively assembling one upon the other a predetermined number of the severed sheets, and means for temporarily arresting the feed means after a plurality of sheets of predetermined number have been severed said means being operated by actuating means operating in synchronism with the assembling means.

2. In a machine of the class described, a transverse cutter for severing sheets from a continuous strip, trimming means for trimming the sheets longitudinally, assembling means for assembling a predetermined number of sheets, means for feeding the sheets from the transverse cutter to the trimming means, and means for feeding the sheets from the trimming means to the assembling means.

3. In a machine of the class described, a transverse cutter for severing sheets from a continuous strip, feed means for feeding the strip to the cutter, means for feeding the sheets along an arcuate path, and trimming cutters for trimming the sheets longitudinally to form arcuate edges along the sheets as the sheets travel in their arcuate path.

4. In a machine of the class described, feeding means for feeding a sheet along an arcuate path and cutters having a fixed situs relative to said feeding means for trimming the sheet as the same passes along its path.

5. In a machine of the class described, a pair of conical feed rolls, means for delivering a sheet of paper to said feed rolls, said feed rolls causing the sheet to travel over an arcuate path, two cutters, each having a fixed situs with reference to said feed rolls and trimming the edges of the sheet as it travels along its arcuate path to form arcuate edges on the sheet.

6. In a machine of the class described, an adhesive applying device, an assembling mechanism, means for feeding sheets to said adhesive applying device and from said adhesive applying device to said assembling mechanism, and a skip mechanism for feeding one of said sheets clear of the adhesive applying device and to said assembling mechanism.

7. In a machine of the class described, a mandrel, an adhesive applying device including an adhesive applying roller, guide means for guiding separate sheets for movement into engagement with said adhesive applying roller and for movement from said adhesive applying roller to said mandrel, means for successively feeding sheets along said guide means and means for periodically moving said guide means in a manner to free one of the sheets from said adhesive applying roller in its passage to the mandrel.

8. In a machine of the class described, a mandrel, an adhesive applying device including an adhesive applying roller, guide means for guiding sheets for movement into engagement with said adhesive applying roller and for movement from said adhesive applying roller to said mandrel, means for feeding sheets along said guide means and means for periodically moving said guide means in a manner to free one of the sheets from said adhesive applying roller in its passage to the mandrel, and an auxiliary adhesive applying device for coating said last named sheet at a defined area thereof.

9. In a machine of the class described, a frame having two angularly arranged parts, means at one of said parts for forming sheets from a continuous strip and progressing them forwardly along the machine, a wrapping mechanism at the other part for wrapping the sheets, one upon the other in frusto conical form, and means intermediate the ends of the frame for feeding the sheets along an arcuate path toward the wrapping mechanism.

10. In a machine of the class described, a frame having two angularly arranged parts, means at one of said parts for forming sheets from a continuous strip and progressing them forwardly along the machine, a wrapping mechanism at the other part for wrapping the sheets, one upon the other in frusto conical form, a pair of conical feed rolls disposed intermediate the ends of the frame for feeding the sheets toward the wrapping mechanism.

11. In a machine of the class described, a frame having two angularly arranged parts, means at one of said parts for forming sheets from a continuous strip and progressing them forwardly along the machine, a wrapping mechanism at the other part for wrapping the sheets, one upon the other in frusto-conical form, a pair of conical feed rolls disposed intermediate the ends of the machine for feeding the sheets toward the wrapping mechanism, and skewing means for turning the sheets prior to their engagement by said conical feed rolls to cause said sheets to travel over an arcuate path toward said wrapping mechanism.

12. In a machine of the class described, a conical mandrel, gripping fingers at the larger end of said mandrel carried thereby, a movable end member for the smaller end of the mandrel, gripping fingers for the smaller end of the mandrel carried by said movable end member, said gripping fingers being all movable into positions overlying the outer surface of the mandrel, means for feeding sheets upon the mandrel with the edges thereof in proximity to said fingers, means for moving said fingers out of engagement with the sheets while the fingers are at the locality of initial engagement of the sheets with said mandrel, said means serving to cause the fingers to engage the sheets throughout their other positions, means for coating the sheets with adhesive prior to their application to the mandrel to cause the sheets to be secured to one another, and means for moving said end member and the fingers carried thereby out of engagement with said mandrel to free the structure formed thereon.

13. In a machine of the class described, a horizontal conical mandrel, means for wrapping sheets of paper about said mandrel and for securing the same together thereon, a pivoted arm, an end member secured to said arm and movable into a position adjacent the smaller end of said mandrel, means carried by said end member for holding the wrapped sheets in position upon the mandrel, and means for ejecting the structure formed thereon.

14. In a machine of the class described, a horizontal conical mandrel, means for wrapping sheets of paper about said mandrel and for securing the same together thereon, a trough disposed beneath said mandrel, means for guiding said trough for movement along an element of said mandrel and outwardly beyond the end of the same, and means operable in conjunction with the movement of said trough for ejecting a formed side wall from said mandrel and depositing the same upon said trough.

15. In a machine of the class described, a horizontal conical mandrel, means for wrapping sheets of paper about said mandrel and for securing the same together thereon, an arcuate trough disposed beneath said mandrel and movable along an element thereof, ejecting means operating in conjunction with said trough to free the structure formed on said mandrel therefrom and to deposit the same upon said trough, and means for tilting said trough when the same is entirely beyond the mandrel to discharge the structure received thereby.

16. In a machine of the class described, a mandrel, an adhesive applying device including an adhesive applying roller spaced from said mandrel and extending in the same direction, the upper surface of said adhesive applying roller being substantially at the same elevation as the upper surface of said mandrel, means for guiding sheets of paper for movement across the upper surface of said adhesive applying roller and to said mandrel, means for feeding the sheets along said guide means, an auxiliary adhesive applying roller disposed between said first named adhesive applying roller and said mandrel, means for guiding said auxiliary adhesive applying roller from tangential engagement with said first named adhesive applying roller to tangential engagement with a sheet carried by said mandrel, and means for periodically raising said guide means to shift the sheet carried thereby out of engagement with said first named adhesive applying roller.

17. In a machine of the class described, a reel for a roll of paper, a feeding device for progressing the paper from the roll through the machine, a transverse cutter for cutting off the paper fed by said feeding device to form the same into separate sheets, a conveyor for progressing the severed sheets along the machine, a second feeding device comprising a pair of conical rollers arranged at an angle with respect to said conveyor, a skewing device for turning the sheets upon said conveyor to feed the sheets angularly into said second named feeding device, cutters having a fixed situs with respect to said second named feeding device and cutting the sheet arcute in form while being fed thereby, a tray upon which the arcuate sheets are deposited by said second named feeding device, an adhesive applying device at the end of said tray, means for feeding the sheets from said tray to said adhesive applying device, a wrapping mechanism adjacent the adhesive applying device and including a conical mandrel on which the coated sheets are assembled, and means for wrapping the sheets about said mandrel to form a completed structure.

18. In a machine of the class described, a reel for a roll of paper, a feeding device for progressing the paper from the roll through the machine, a transverse cutter for cutting off the paper fed by said feeding device to form the same into separate sheets, a conveyor for progressing the severed sheets along the machine, a second feeding device comprising a pair of conical rollers arranged at an angle with respect to said conveyor, a skewing device for turning the sheets upon said conveyor to feed the sheets angularly into said second named feeding device, cutters having a fixed situs with respect to said second named feeding device and cutting the sheet arcuate in form while being fed thereby, a tray upon which the arcuate sheets are deposited by said second named feeding device, an adhesive applying device at the end of said tray, means for feeding the sheets from said tray to said adhesive applying device, a wrapping mechanism adjacent the adhesive applying device and including a conical mandrel on which the coated sheets are assembled, means for wrapping the sheets about said mandrel to form a completed structure, means for ejecting the formed structure from said mandrel, and means for periodically arresting the movement of said first named feeding means during the ejection of the formed structure from said mandrel.

19. In a machine of the class described, a pair of conical feed rolls, means for delivering a sheet to said feed rolls, said feed rolls causing the sheet to travel over an arcuate path, two rotary cutters situated in close proximity to said feed rolls, each of said cutters comprising two circular shears cooperating with one another to shear the sheet progressed by said feed rolls, one of said cutters being disposed near one end of the feed rolls and the other being disposed near the other end of the feed rolls and the meeting edges of the shears being disposed substantially in the plane of tangency of said rolls.

20. In a machine of the class described, a mandrel, an adhesive applying device including an adhesive applying roller, a tray extending toward said roller and directing sheets placed thereon toward said roller, means for feeding the sheets along said tray, means for pivoting said tray at its outermost end for movement in a manner to raise the forward end of the tray above said roller, and means for feeding the sheets from said tray and roller to said mandrel.

21. In a machine of the class described, a mandrel, an adhesive applying device including an adhesive applying roller, a tray extending toward said roller and directing sheets placed thereon toward said roller, means for feeding the sheets along said tray, means for pivoting said tray at its outermost end for movement in a manner to raise the forward end of the tray above said roller, auxiliary supporting means carried by said tray and means for sliding said supporting means in a manner to form an extension to said tray when the tray is elevated above the roller to carry the sheets over the roller.

22. In a machine of the class described, a mandrel, an adhesive applying device including an adhesive applying roller, a tray extending toward said roller and directing sheets placed thereon toward said roller, means for feeding the sheets along said tray, means for pivoting said tray at its outermost end for movement in a manner to raise the forward end of the tray above said roller, keepers secured to said tray, fingers normally disposed beneath said tray and slidably mounted in said keepers, said fingers in their extreme positions forming a continuation of said tray above the adhesive applying roller and means for extending said fingers when the tray is in elevated position.

23. In a machine of the class described, a mandrel, means for successively feeding sheets to said mandrel, an adhesive applying device adapted to coat the entire surfaces of certain of said sheets, another adhesive applying device adapted to coat portions of the surfaces of certain of the sheets, and means for alternately operating said adhesive applying devices.

24. In a machine of the class described, a mandrel, means for successively feeding sheets to said mandrel, an adhesive applying device adapted to coat the entire surfaces of certain of said sheets, another adhesive applying device adapted to coat portions of the surfaces of certain of the sheets, means for operating said second named adhesive applying device a single time to partially coat the first sheet applied to the mandrel, and means for successively operating said first named adhesive applying device a predetermined number of times to provide a predetermined number of fully coated sheets for application to the first named sheet and to one another.

25. In a machine of the class described, a mandrel, means for successively feeding sheets to said mandrel, an adhesive applying device adapted to coat the entire surfaces of certain of said sheets, another adhesive applying device adapted to coat portions of the surfaces of certain of the sheets, means for operating said second named adhesive applying device a single time to partially coat the first sheet applied to the mandrel, and means for successively operating said first named adhesive applying device a predetermined number of times to provide a predetermined number of fully coated sheets for application to the first named sheet and to one another, means preventing the application of adhesive by the first named adhesive applying device during operation of the second named adhesive applying device and for preventing the application of adhesive by said second named adhesive applying device during operation of said first named adhesive applying device.

26. In a machine of the class described, an elongated frame, means at one end of said frame for forming sheets from a continuous strip and progressing them along said frame, a pair of conical feed rolls carried by the frame, cutters cooperating with said feed rolls for cutting the sheets in arcuate form and skewing means for turning the sheets prior to the engagement with the sheets by said conical feed rolls to cause the sheets to travel in the proper manner over an arcuate path through said feed rolls.

27. In a machine of the class described, an elongated frame, means at one end of said frame for forming sheets from a continuous strip and progressing them along said frame, feed means carried by the frame for feeding the sheets over an arcuate path, and skewing means for turning the sheets prior to their engagement with said feed means.

28. In a machine of the class described, an elongated frame, means at one end of said frame for forming sheets from a continuous strip and progressing them along said frame, feed means carried by the frame for feeding the sheets over an arcuate path, engaging members at opposite ends of the sheet movable laterally with respect to said frame and in opposite directions and adapted to skew the sheets prior to their engagement by said feed means.

29. In a machine of the class described, a conical mandrel, means for winding sheet material upon said mandrel to form a container side wall, a movable end member for the smaller end of the mandrel, said end member holding the sheet material in position upon the mandrel during formation of the side wall, and means for guiding said end member for movement away from the mandrel to free the side wall formed thereon.

30. In a machine of the class described, a conical mandrel, means for winding sheet material upon said mandrel to form a container side wall, gripping means at the larger end of the mandrel carried by the mandrel, a movable end member for the smaller end of the mandrel, gripping means for the smaller end of the mandrel and carried by said movable end member, and means for guiding the movable member for movement away from the smaller end of the mandrel upon completion of the side wall.

31. In a machine of the class described, a mandrel, a plurality of movable gripping fingers at one end of the mandrel carried thereby and movable therewith, said gripping fingers being all movable relative to the mandrel into positions overlying the outer surface of the mandrel and into positions free of the surface of the mandrel, means for feeding sheet material upon the mandrel with the edge thereof in proximity to said fingers, a stationary cam for moving said fingers out of or into engagement with the surface of the mandrel as the mandrel rotates, said cam being positioned so as to hold the fingers out of engagement with the sheet material at its locality of initial engagement with the mandrel, said cam serving to cause the fingers to engage the sheet material throughout their other positions, and means for applying adhesive to the sheet material.

32. In a machine of the class described, a mandrel, a plurality of gripping fingers at one end of the mandrel having a fixed situs circumferentially with respect to the mandrel and being pivoted to the mandrel and movable into positions overlying the surface of the mandrel and positions free therefrom, and fixed means for successively moving said fingers as the mandrel rotates to cause certain of the fingers to move into overlying position and other of the fingers to clear the mandrel, means for feeding sheet material upon the mandrel, and means for applying adhesive to the sheet material.

33. In a machine of the class described, a mandrel having a flange issuing outwardly therefrom at one end, a plurality of gripping fingers slidably mounted in said flange and adapted to be moved from positions overlying the surface of the mandrel to positions receded within said flange, cam means for raising said fingers upon movement away from said surface, and resilient means for urging said fingers against said surface when overlying the same.

34. In a machine of the class described, a mandrel having a flange issuing outwardly therefrom at one end, a plurality of gripping fingers slidably mounted in said flange and adapted to be moved from positions overlying the surface of the mandrel to positions receded within said flange, rods pivoted to said fingers and to said mandrel inwardly of said flange, said rods extending beyond said fingers and cam means for successively engaging said rods to shift said fingers.

35. In a machine of the class described, a mandrel, gripping fingers at one end of the mandrel pivotally and slidably supported with reference to said mandrel and adapted to swing from positions overlying the surface of the mandrel to positions clear of the mandrel, supports to which said fingers are pivotally and slidably connected, shanks issuing outwardly from said fingers, said shanks having shoulders thereon, resilient means operating between said supports and shoulders and urging said fingers into engagement with the surface of the mandrel, and cam means engaging said shanks for sliding said fingers to raise the same from the surface of said mandrel and for swinging said fingers to free the same from the mandrel.

36. In a machine of the class described, a mandrel, gripping fingers at one end of the mandrel pivotally and slidably supported with reference to said mandrel and adapted to swing from positions overlying the surface of the mandrel to positions clear of the mandrel, supports to which said fingers are pivotally and slidably connected, and cam means for sliding said fingers to raise the same above the surface of the mandrel and other cam means for swinging said fingers to free the same of the mandrel.

37. In a machine of the class described, a mandrel, gripping fingers at one end of the mandrel pivotally and slidably supported with reference to said mandrel and adapted to swing from positions overlying the surface of the mandrel to positions clear of the mandrel, supports to which said fingers are pivotally and slidably connected, shanks issuing outwardly from said fingers, said shanks having shoulders thereon, resilient means operating between said supports and shoulders and urging said fingers into engagement with the surface of the mandrel, said fingers rotating with the mandrel and a fixed cam having a groove therein, said shanks being provided with balls at the ends thereof riding in said groove, the diameter of said groove varying throughout the peripheral extent thereof and said groove being helical at one portion of the peripheral extent thereof to cause said fingers to raise from the surface of the mandrel and to be moved free from the same.

38. In a machine of the class described, a horizontal mandrel, means for wrapping sheet material upon said mandrel and for securing the same together thereon to form a side wall, an end member movable toward and from said mandrel, and means carried by the end member for holding the sheet material in position upon the mandrel.

39. In a machine of the class described, a horizontal mandrel, means for wrapping sheet material about said mandrel and for securing the same together to form a container side wall, gripping means carried by said mandrel and disposed at one end thereof, a movable end member, and other gripping means carried by the end member and adapted to cooperate with the first named gripping means for holding the sheet material in position upon the mandrel.

40. In a machine of the class described, a mandrel, means for wrapping sheet material about said mandrel and for securing the same together thereon to form a container side wall, a trough disposed in close proximity to said mandrel, means for guiding said trough for movement along an element of said mandrel and outwardly beyond one end of the same, and means operable in conjunction with the movement of said trough for ejecting the formed side wall from the mandrel and depositing the same upon the trough.

41. In a machine of the class described, a mandrel, means for wrapping sheet material about said mandrel, and for securing the same together thereon to form a container side wall, a pivoted arm, an end member secured to the arm and movable into a position adjacent one end of the mandrel, means carried by said end member for holding the wrapped sheet material in position upon the mandrel, means for ejecting the formed side wall, and means for moving said end member away from the mandrel upon ejection of the side wall therefrom.

SWAN SMITH.